(12) United States Patent
Smith et al.

(10) Patent No.: US 10,678,937 B2
(45) Date of Patent: Jun. 9, 2020

(54) RESOLUTION SYSTEM THAT PROVIDES ACCESS TO REMOTE DATA LOCALLY

(71) Applicant: UT Battelle, LLC, Oak Ridge, TN (US)

(72) Inventors: Jeff W. Smith, Oak Ridge, TN (US); Shaun S. Gleason, Oak Ridge, TN (US); Michael L. Baker, Oak Ridge, TN (US); David L. Bond, Oak Ridge, TN (US); Gregory L. Capps, Oak Ridge, TN (US); Robert A. Franklin, Oak Ridge, TN (US); Kimberly B. Jeskie, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 263 days.

(21) Appl. No.: 15/842,507

(22) Filed: Dec. 14, 2017

(65) Prior Publication Data
US 2018/0204019 A1    Jul. 19, 2018

Related U.S. Application Data

(60) Provisional application No. 62/447,249, filed on Jan. 17, 2017.

(51) Int. Cl.
*G06F 21/62* (2013.01)
*G06F 3/06* (2006.01)
(Continued)

(52) U.S. Cl.
CPC .......... *G06F 21/6218* (2013.01); *G06F 3/067* (2013.01); *G06F 3/0623* (2013.01);
(Continued)

(58) Field of Classification Search
CPC .... G06F 21/6218; G06F 3/0637; G06F 21/44; G06F 3/067; G06F 12/0875; G06F 3/0659; G06F 3/0623; G06F 2212/60; G06F 2212/154; H04L 67/2842; H04L 67/06; H04L 67/2814; H04L 67/2823
See application file for complete search history.

(56) References Cited

U.S. PATENT DOCUMENTS

2002/0099852 A1*  7/2002  Fischer ............... G06F 16/9577
                                                               709/246
2005/0204035 A1*  9/2005  Kalish .................. G06F 16/955
                                                               709/224
(Continued)

*Primary Examiner* — Abu S Sholeman
(74) *Attorney, Agent, or Firm* — Benesch, Friedlander, Copln & Aronoff LLP

(57) ABSTRACT

A system and method that provides access to remote data locally by identifying and downloading linked content from a plurality of remote sources through a communication network; decomposing the downloaded content into local content elements by intercepting links between the content elements and mapping the intercepted links to redirected links that locate the same download content in a local cache or a local server proxy; identifying remote devices requesting access to the local cache or the local server proxy and the device's functionality through a tracking code stored on the remote devices and a probabilistic tracking; and providing access to the local cache or the local server proxy in response to authorizations associated with the identified devices and a user.

20 Claims, 29 Drawing Sheets

(51) Int. Cl.
*G06F 12/0875* (2016.01)
*H04L 29/08* (2006.01)
*G06F 21/44* (2013.01)

(52) U.S. Cl.
CPC .......... *G06F 3/0637* (2013.01); *G06F 3/0659* (2013.01); *G06F 12/0875* (2013.01); *G06F 21/44* (2013.01); *H04L 67/06* (2013.01); *H04L 67/2814* (2013.01); *H04L 67/2823* (2013.01); *H04L 67/2842* (2013.01); *G06F 2212/154* (2013.01); *G06F 2212/60* (2013.01)

(56) References Cited

U.S. PATENT DOCUMENTS

| | | | |
|---|---|---|---|
| 2008/0235368 A1* | 9/2008 | Nagaraj | H04L 67/02 709/224 |
| 2014/0059165 A1* | 2/2014 | Kim | G06F 16/176 709/217 |
| 2014/0143444 A1* | 5/2014 | Agrawal | H04L 67/2885 709/247 |
| 2016/0112397 A1* | 4/2016 | Mankovskii | H04L 63/105 726/6 |

* cited by examiner

| 13 Waving at you | ☆ 7 Alerts | ⊙ 2 on Radar |
|---|---|---|
| Sort by system name ▽ | | |

| Projects | | |
|---|---|---|
| Projects | Project management Office | ② |
| | --- | ▯ ◇ |

| Learning | | |
|---|---|---|
| Learning | Export Control Awareness | ② |
| | --- | ▯ ◇ |
| Learning | Personal Privacy Protection at ORNL | ▯ ◇ |
| | --- | |
| Learning | Physics | ▯ ◇ |
| | --- | |
| Learning | Sexual Harassment in the Workplace | ▯ ◇ |
| | --- | |
| Learning | Workforce Diversity | ▯ ◇ |
| | --- | |

| Employee Performance Management | | ② |
|---|---|---|
| | Performance Plan (2017) | ▯ |
| | --- | |
| | 360 Assessment | ▯ |
| | --- | |

RESolution

*Simplify your work,
improve scientific productivity.
Learn more ↗*

FIG. 4

| Procurement Approvals | Purchase Orders |
|---|---|
| Purchase Orders 12 | PO Amount ▽    Visible |
| Requisitions ◇ | $1,000,000.00<br>ABC LLC<br>Project Mgmt. Validity 01/2017 - 02/2018 PO: ABC123 |
| Invoices | $1,000.00<br>123 LLC<br>Virtual Mgmt. Validity 01/2017 - 02/2019 PO: 123 |
| Agreements | $251,513.00<br>Why Me LLC<br>Validity 03/2015 - 02/2019 PO: 456ABC123 |
| Educational Opportunities | |
| Marketplace ◇ | $1000,000,000.01<br>Widgets LLC<br>Validity 03/2017 - 02/2019 PO: HABCD123 |
| Procurement Officer | $1000,000,010.02<br>Say-U Inc.<br>Validity 03/2012 - 02/2019 PO: OK123 |
| | $1,00.00<br>WHYBO Inc.<br>Validity 03/1909 - 02/2019 PO: ENDOFTIME123 |

| Action List | | | | |
|---|---|---|---|---|
| < Projects | | | | |
| Projects | | | | |
| Project 3 | | | | |
| Procurement | Dashboard | Team FTE % by year | | Continue |
| Site Access | Project Information | | | |
| Search | Schedule ◇ | | Add from ORNL directory | Add people not in directory |
| Visual Guide | Financials | Name | 2015 | 2016 | 2017 |
| Feedback | Charge Number | Team Member 1 | 4% | 2% | 9% |
| Impersonation | Team | Team Member 2 | 9% | 7% | 9% |
| About | Risk | Team Member 3 | 9% | 19% | 9% |
| Admin | Links | Team Member 4 | 11% | 2% | 36% |
| | Status my project ◇ | Team Member 5 | 23% | 22% | 9% |
| | | Team Member 6 | 17% | 2% | 16% |
| | | Team Member 7 | 4% | 38% | 9% |
| | | Team Member 8 | 5% | 2% | 22% |
| | | Team Member 9 | 4% | 2% | 9% |
| | | Team Member 10 | 8% | 6% | 9% |
| | | Team Member 11 | 4% | 12% | 41% |
| | | Team Member 12 | 4% | 2% | 9% |
| | | Team Member 13 | 14% | 24% | 19% |
| | | Team Member 14 | 13% | 2% | 9% |
| | | Team Member 15 | 9% | 7% | 5% |

ORNL Portal

FIG. 20

Projects / System 1

- Action List
- Projects
- Procurement
- Site Access
- Search
- Visual Guide
- Feedback
- Impersonation
- About
- Admin Dashboard
Project Information
Schedule
Financials
Charge Number
Team
Risk
Links
Status my project ◇

Status my project

Project status as of Nov 12, 2016

[Cost] > Schedule > Status summary > Technical Accomplishments

How you are doing against your FY17 spend plan?
● I think I will spend all my plan this year.
○ I think I will underspend this year's plan by [ ]
○ I think I will overspend this year's plan by [ ]

Do you think this will affect your total project cost?

Yes ○    No ●

[Next]

[Save] [Finalize]

FY17 Observations
- You are currently funded at $124,000
- You planned to spend $33,413 to date
- You have actually spent $11,306 and committed $0 for a total of $11,306 to date
- You have $112,694 left to spend over the next 10 months

* ORNL Portal

RESOLUTION SYSTEM THAT PROVIDES ACCESS TO REMOTE DATA LOCALLY

PRIORITY CLAIM

This application claims priority to U.S. Provisional Patent Application No. 62/447,249 filed Jan. 17, 2017, titled "Resolution System," which is herein incorporated by reference.

STATEMENT REGARDING FEDERALLY SPONSORED RESEARCH AND DEVELOPMENT

This invention was made with United States government support under Contract No. DE-AC05-000R22725 awarded by the United States Department of Energy. The United States government has certain rights in the invention.

BACKGROUND OF THE DISCLOSURE

Technical Field

This disclosure relates to management and in particular, to a system and method that manages projects.

Related Art

It is challenging to manage enterprise resources as many monitoring processes cannot be integrated into a holistic resource. These monitoring processes are mutually exclusive in that they attempt to identify, optimize and streamline either material requirements or select back office functions. They cannot manage multiple resources, large data, and employee records. As such, it is also difficult to implement measurable goals and objectives making these monitoring processes directionless. Flexibility is a real challenge too as these monitoring processes are customized extensively.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

FIG. 4 is a first display of the RES system in which content is accessed.

FIG. 6 is a first portal application of the RES system.

FIG. 7 is a gauge rendered on the RES system.

FIG. 8 is an HR portal rendered on the RES system,

FIG. 9 shows the virtual cards rendered by the RES system.

FIG. 18-24 illustrate the information processed to initiate a project management by the RES system.

DETAILED DESCRIPTION

Figure 1:
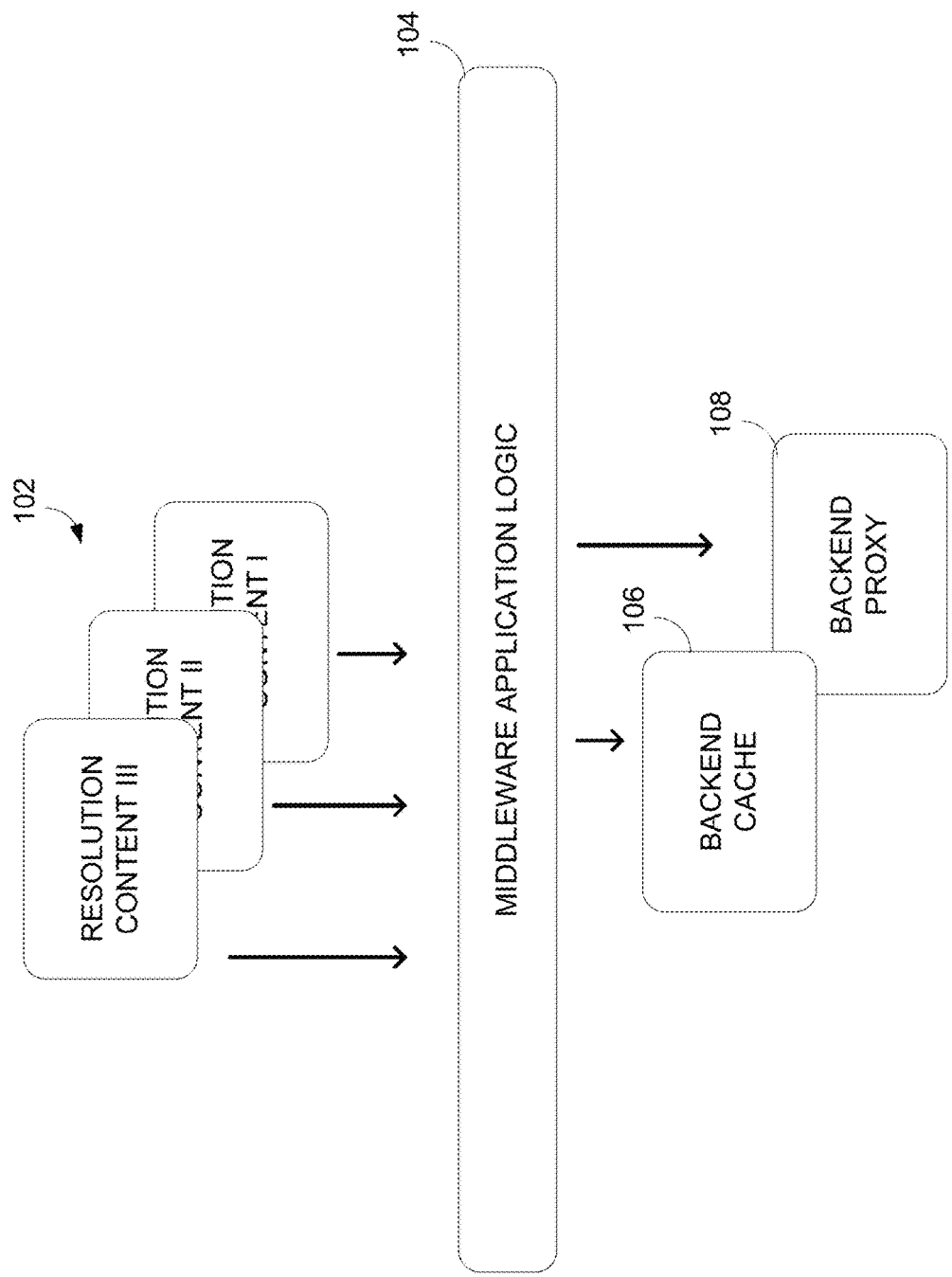
FIG. 1 is a schematic view of harvested content.

Research Enterprise Systems (hereinafter referred to as RESolution or RES), provide rich visualizations of project data. These systems streamline processes across procurement, research, product assembly, manufacturing, service, sales, finance, and/or human resources using local caches and/or local proxies. These systems generate graphically rich interactive project screens that dynamically render project information over time while rendering cost commitments through transparent mappings of resource addresses of remote sources and destinations to local sources such as local caches and/or local proxies, for example. The transparency mapping and redirection to local sources render an impression that content is being served from external remote sources and destinations without the latencies, delay, or bandwidth use that accompanies conventional remote requests/responses in use today. The systems dynamically highlight key attributes of projects through scalable time periods through a program that may be turned on or off through a common action much like a toggle switch. The systems provide alerts and action indicators through dynamic project cards while providing observations that users select or enter. In operation, some users are granted access to any projects in their program or line of command through desktop or mobile interfaces (e.g., through an Apple iOS or Android operating system or device) by the system's knowledge of its users without processing the visitor's secure data. When access is granted, users can enter observations and establish analytics that track program performance.

To access objects that render content, connections are normally made between remote external resources and local interfaces. For each object requested, conventional interfaces send requests and in return receive responses from the remote external resources. When content is graphic intensive, in addition to downloading textual external resources, conventional interfaces download a number of images some of them large, but many small, including those images that provide hard-coded formatting that can be used to render the format delivered to the user. Establishing network connections for each request/response can waste network bandwidth and cause delay, as several network packets must be exchanged before a transmission even begins. Further when content is rendered from multiple remote external resources, some conventional external resources provide deep links that link content to other remote content. This linked content is served by remote external resources through hyperlinks that redirect the user from their starting document rendered in the user's local environment to an external document rendered in a new environment that may be subject to security vulnerabilities or may run in an unsafe mode. The creation of a new environment also subjects users to network delays that accompany the responses that create the new environment. Further, when a number of users requests are transmitted to a single remote external source at once, network bottlenecks can occur or multiple requests can overwhelm the remote external source to the point that the remote external source is unable to respond to the requests especially when the remote external resources generates content dynamically.

Figure 2:
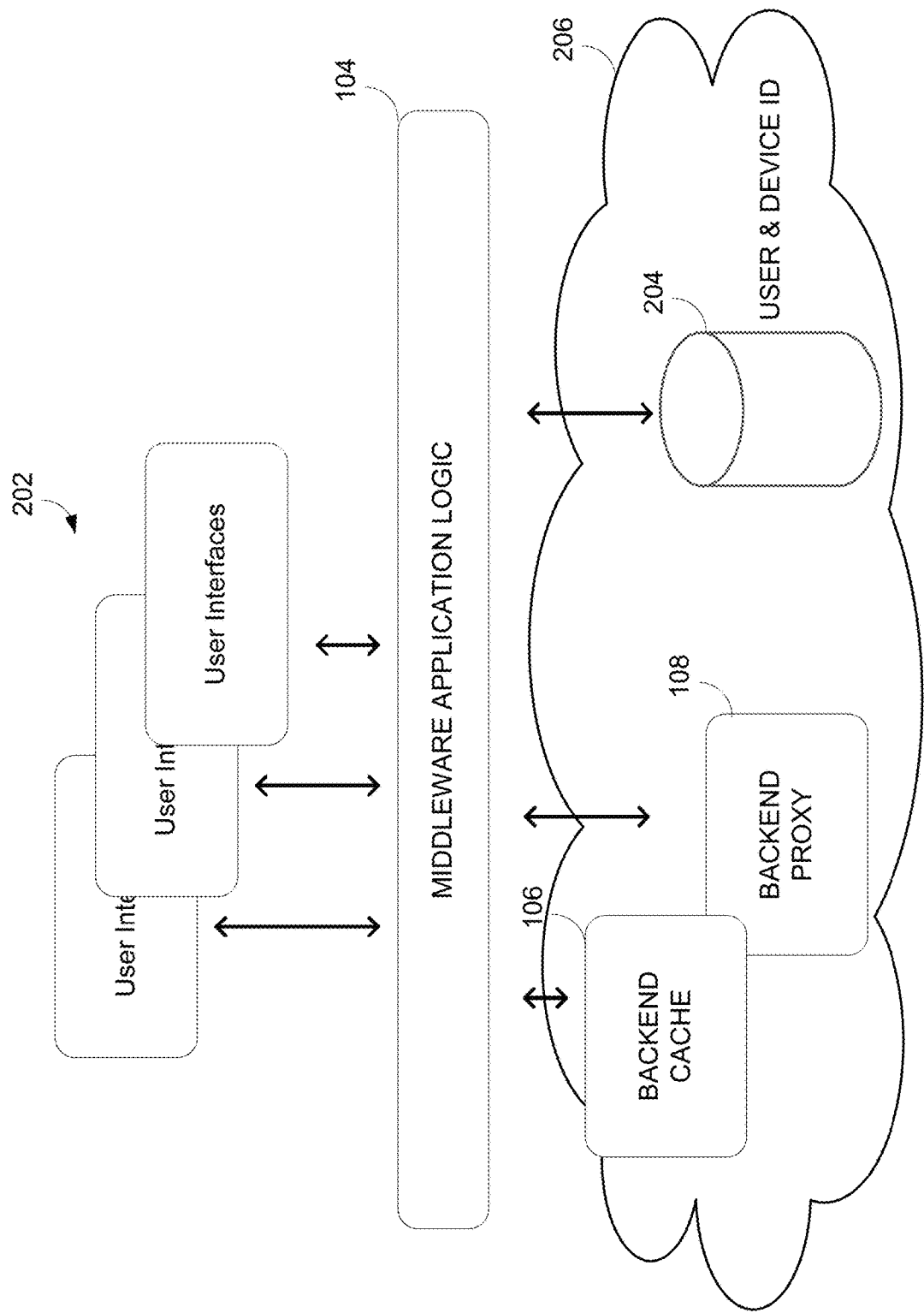
FIG. 2 is a side schematic view of an interface layer and an identification layer.

Rather than requiring users to access multiple remote external resources when managing their enterprise resources, the RES system of FIG. 1 renders content downloaded from multiple remote resources 102 through a middleware application 104 on a periodic basis (e.g., one per night) or in real time. The middleware application 104 downloads content and intercepts links between content elements such as words, symbols, and images and other documents, elements, words, or scripts and transparently maps those links to redirected links generated by the middleware application 104. The redirected links provide new addresses to the element originally linked objects and the protocol that may be used to access them. The new addresses for the resource specify the new source/destination, which in FIG. 1 resides locally in a backend cache 106 and/or backend proxy 108, which may be stored and served by a local cloud storage 206 of FIG. 2, or in alternate systems, stored in a local browser-based collaboration and document management platform (e.g., a SharePoint site) or an SAP site, for example. By redirecting the link and/or generating new links the RES system can display harvested content from its own local backend cache 106, backend proxy 108, local SharePoint or SAP site, and/or integrated software applications and not be subject to the delays and latencies that come with remote requests/responses. This process in turn reduces the load on the external remote resources and network loads especially when the external remote resources serve dynamic content. By serving content locally, content rendering speeds up dramatically.

Drawing upon a plurality of device profiles stored in the user & device identification database 204, some RES systems deliver content to most device profiles in use by identifying unique combinations of characteristics that differentiate users and wireless devices from one another through profile comparisons. By combining device data with contextual information 202 about the user such as for example, the user's location (e.g., the user's device proximity via global positioning data rendered by his/her wireless device), addresses (e.g., IP address), network connection speeds, and prior software usage identifiers that are stored in the user's profile in the user & device ID database 204, a probabilistic tracking is executed by the middleware 104 that identifies the user, and in some applications the user across multiple devices (a cross-device tracking) to ensure a consistent presentation of the RES resources. Once a user and/or device is identified, the content delivered by the RES systems is customized to the form factor of the device that the user is using. The middleware application 104 also tailors the functionality that the RES system provides to the identified device's capabilities. In some RES systems, a deterministic tracking is used in addition to or in the alternate to the probabilistic tracking. The deterministic tracking relies on logged-in user data to identify users. The logged-in user data may be provided directly to the RES systems by its users or collected from a platform that collects user data such as email addresses or asks users to sign-in, which is then retained on user devices.

Figure 3:
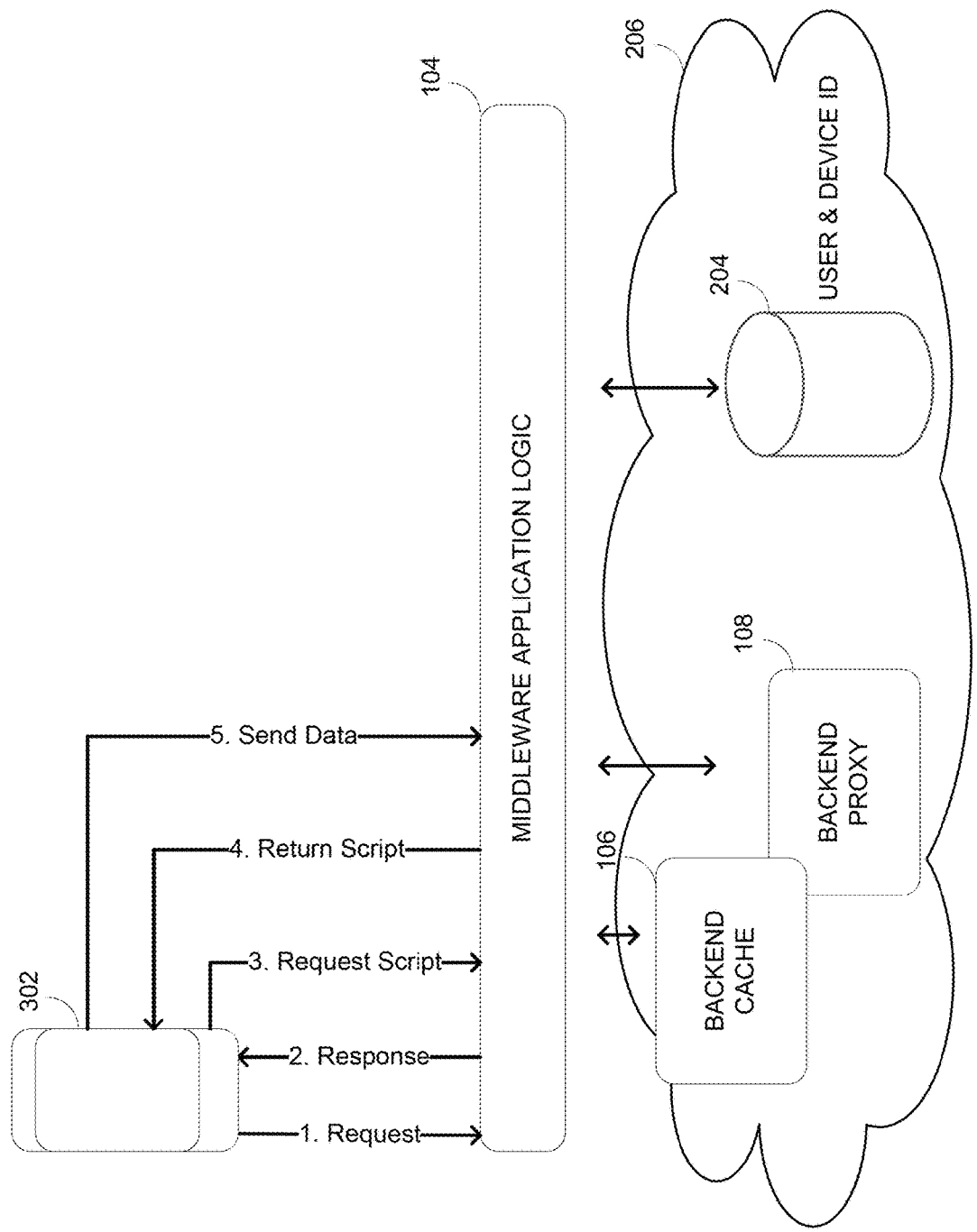
FIG. 3 is block diagram of a user and device identification process.

An exemplary device and user identification is shown in FIG. 3. In FIG. 3, a wireless device 302 makes a request to access or execute the RES system via a request at act 1. An exemplary middleware application 104 may respond by delivering content and tracking code or a tracking code snippet at act 2 to wireless device 302. The tracking code snippet may collect and send data to the middleware application 104 that contain details about the wireless device 302, such as the version of Java and Flash supported, the browser or native application supported, the device's screen resolution, the device's operating system, cookie information, prior RES session information, and/or other information. The collected data is transmitted to the middleware application 104 when the wireless device 302 requests scripts, such as the client-side java scripts that may render portions of the RES display functionality at act 3. If the wireless device 302 is identified through a deterministic tracking, as described above, the device identification and user identification may be transmitted to the wireless device 302 with objects that are responsive to the script request at act 4. If the wireless device 302 is not identified because the device and/or user identification is unavailable, the middleware application 104 transmits a temporary user and device identifier and returns a request for the objects needed to execute a probabilistic tracking. The request may be transmitted to wireless device 302 through a script such as a java script. In return, wireless device 302 transmits the requested objects to the middleware application 104 at act 5, which is then processed against the profiles stored in the user & device ID database 204 to identify a user and an existing device profile automatically. If a match occurs, the user identification and device identification is returned to the wireless device 302 in response to the next request issued by the wireless device 302. If the device or user is not found, a deterministic tracking is executed at the wireless device 302 and the user and device identifier are stored in a new profile with the user & device ID database 204. In those instances, when additional devices used by the same user are matched, the corresponding device identifiers are associated with the user through that user profile in the user & device ID database which allows the middleware application 104 to execute cross-device tracking and seamlessly deliver and serve content in session across devices.

FIG. 4 is an interlinked display rendered by the RES systems. The display comprises a detail panel that may be used to manage time, funding, and other resources. In FIG. 4, the detail panel organizes content through tabs that makes it easy for users to switch between different content through application program interfaces that render an integrated user interface 104. Included in the tabs are: Actions (associated with the ribbon icon); Alerts (associated with a star icon); and Radar (associated with a target like icon). The tabs provide a summary view that the user may select and interrogate to learn more information. The level of information rendered in each tab by RES is system specific, meaning the specific data or software (e.g., scripts) it interrogates determine the level or depth of information provided to each user. If more information is needed, some tabs provide external links to those systems to retrieve even more granular or specific information.

Figure 5:
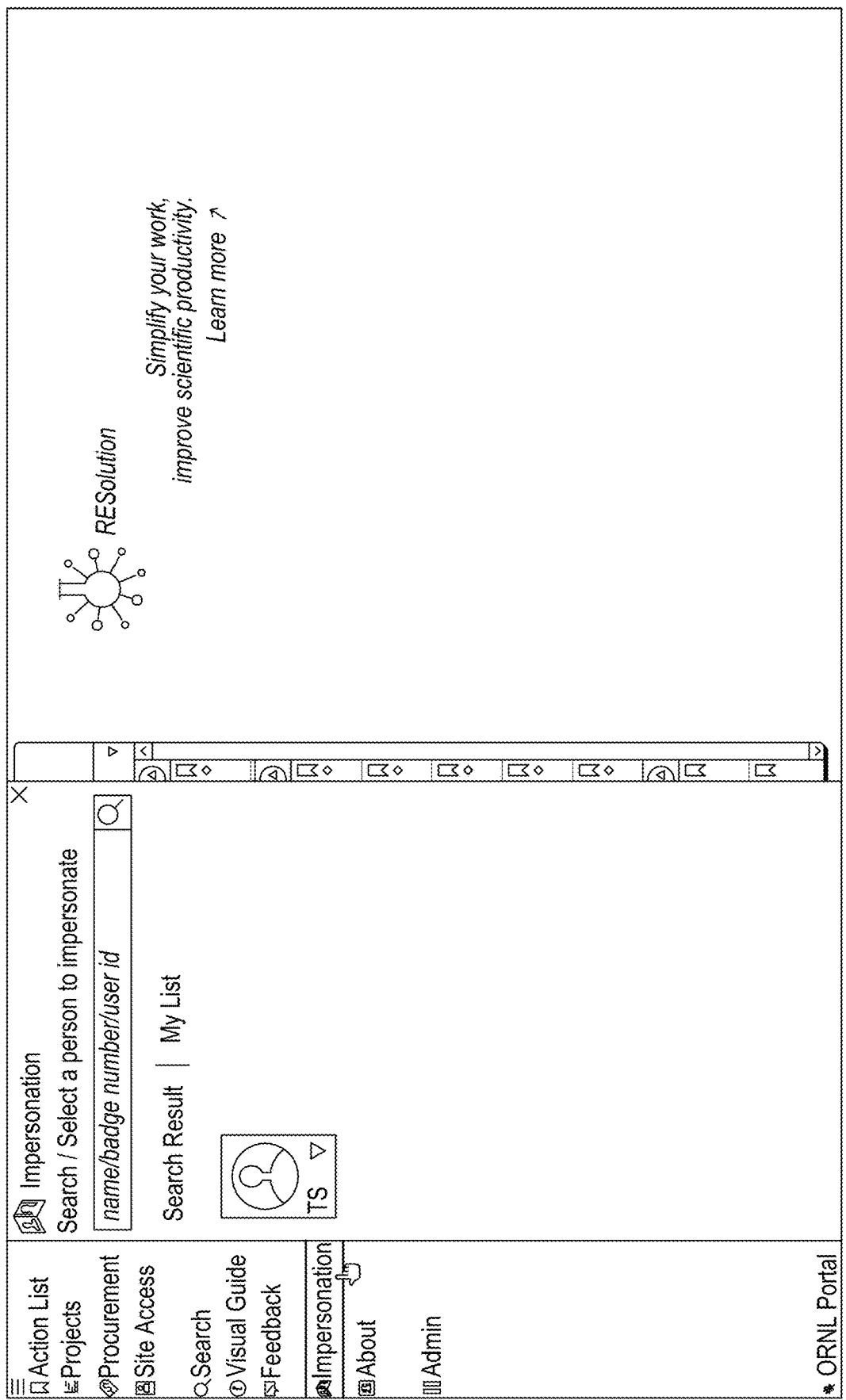
FIG. 5 shows impersonation entry into the RES system.

When a user selects any of the tabs, the RES system asynchronously polls local RES-integrated software monitoring applications and requests all action items relevant to that particular user or designated individual. In other words, based on the permission granted, a user may view his/her records or the records of another (a designated individual) through the impersonation feature displayed in FIG. 5. The data and files provided through the impersonation is filtered to reflect the appropriate access permission of that user. The impersonation feature renders a curated view relative to the appropriate permissions of the user seeking access.

When a user selects the Actions tab, the RES system asynchronously polls local RES-integrated software monitoring action items and filters the retrieved action items based on the appropriate permissions. When a user selects an item in the action list (shown toward the left edge in FIG. 4), RES transmits a second request to the local software monitoring applications to receive more detailed information related to the selected action item. RES displays these details online and to the right of its action list. Despite its name, Actions are not a typical to-do list. A to-do list suggests items that only require actions such as go, review, plan, purchase, send, etc. exclusively. In RES Action notifies users of subject matter that the user needs to be aware of, track, or possibly take action on.

When a user navigates to the Alerts tab (the tab associated with the star icon), he/she receives information about something of interest or something that might require their attention (outside of actions). An exemplary alert might inform the user that a package is delayed and will be delivered later than scheduled or it may inform the user that a pending request or authorization has been stuck in a particular workflow for a predetermined amount of time. In the RES system, each alert is persisted in the local cache 106 with a unique ID and not dynamically generated every time an action list selected. This allows users to dismiss alerts through filtering which blocks dismissed IDs when they are received or may be rendered in the alert tab of the RES system. Finally, the radar tab allows users to track programs or projects that may occur later in time—distant in time.

Figure 7:
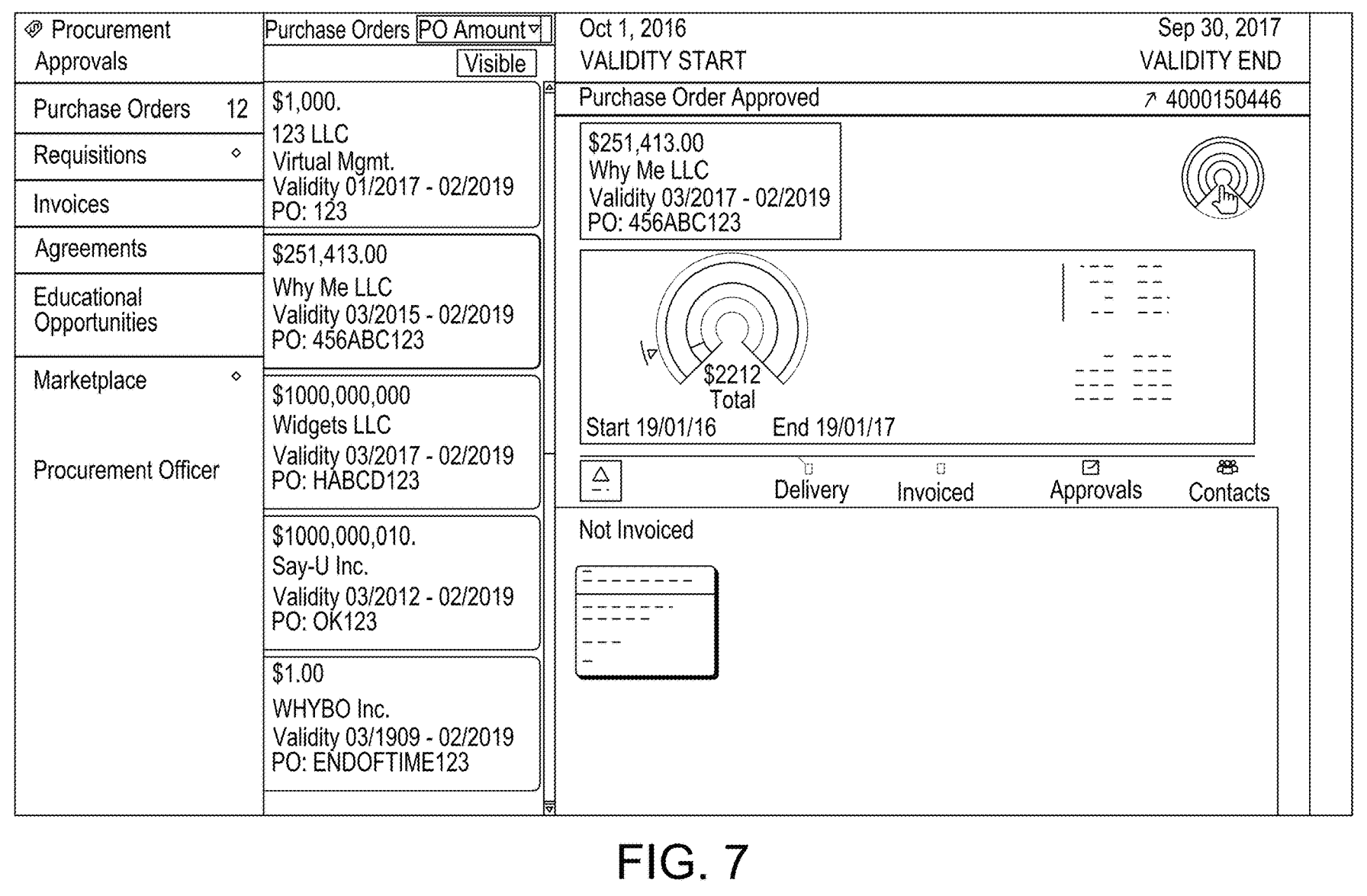

Besides providing a portal to scheduling events, RES also integrates native-like applications. For example, a procurement application may provide more information and data than the prior list through the middleware application 104. In FIG. 6, RES displays the number of pending purchase orders (6 are shown), requisitions, invoices, agreements, education and marketplace. When an item is selected, a second request is transmitted to the procurement application through the middleware application 104 which renders more detailed information like that shown in FIG. 7. In FIG. 7, a gauge, the icon shown below the pointer shaped like a hand provides a condensed summary and a visual measure of the charge. Actuation of the icon renders a magnified instance of the icon that shows the amount and percentage that is funded, the amount and percentage that is costed and its inverse through flash based renderings and/or animations that is supplemented by text. Other icons render summaries of the approvals rendered, details or line items of the invoice, percentage of the expenses invoiced, the life cycle of the purchase orders and modifications linked to the invoice, and the contacts that are attached to a particular invoice. Links to the actual documents are also provided providing traceability of the content without transporting the user outside of the RES environment. A similar scheme renders the same functionality for requisitions, invoices, agreements, education and marketplace.

Figure 8:
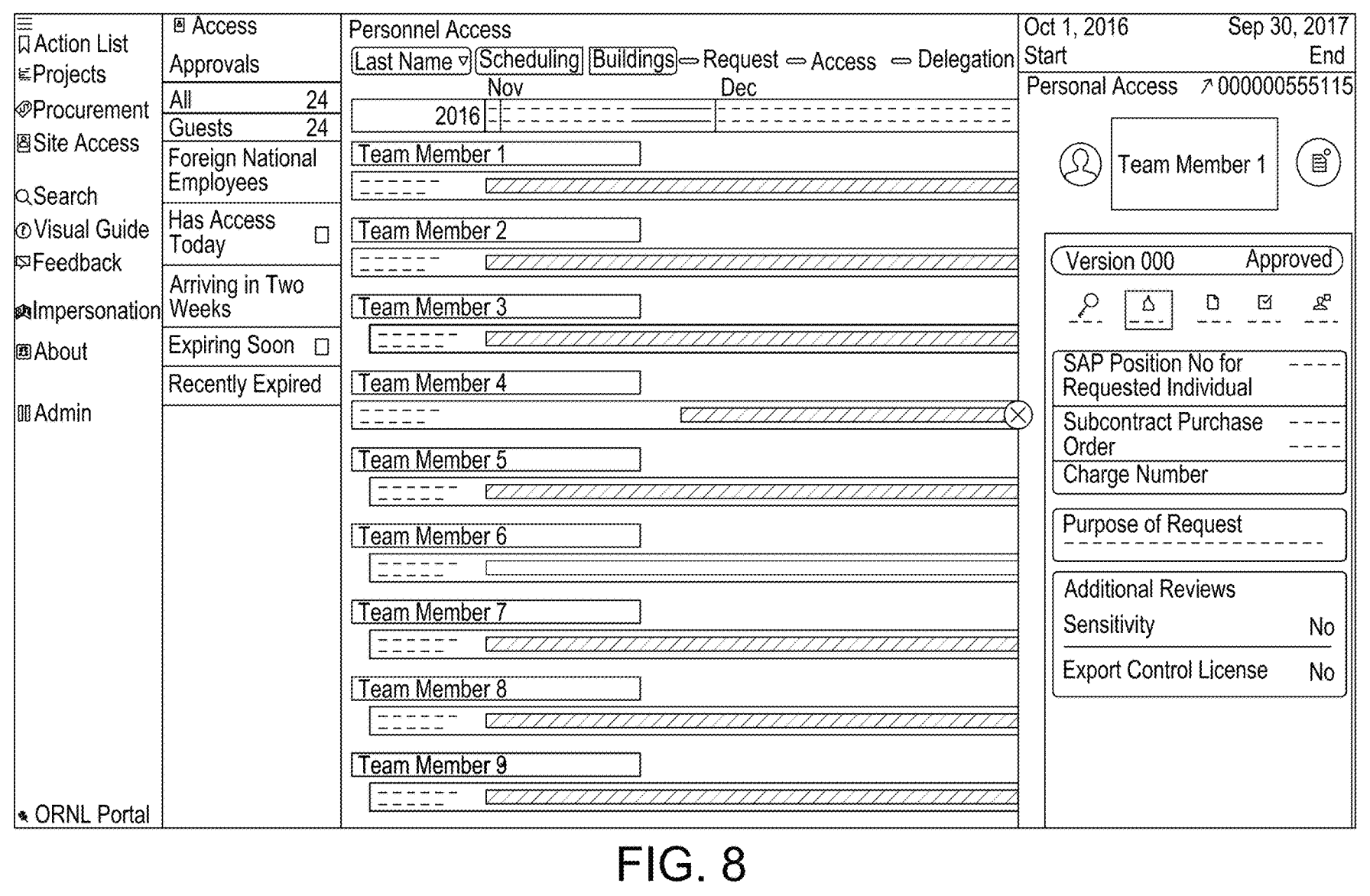

Another native like application in RES renders human resource functionalities as shown in FIG. 8. The Personal Access application shown in FIG. 8 provide links to resources that provide reasoning for a hire, the related purchase orders, the employee's status (e.g., a permanent employee or subcontractor), the employee's hire date, the purpose for the request, etc. This information is rendered in a virtual card positioned near the right of the display. As shown the display also shows who has access to the RES system. For example, Team Member 6 has not yet been granted access to the RES system.

As described, Actions, Alerts, Radar, procurement, and personal access user interfaces are portals that harvest data from diverse sources and integrates the information in a uniform way. Each information source is assigned to a dedicated functionality that is organized and rendered according to the functional aspects that the data represents. In contrast, the project functionality that is part of the RES system is a native application programmed within the RES system that may also harvest external data, such as contract data, to manage and display project functionality.

Figure 9:
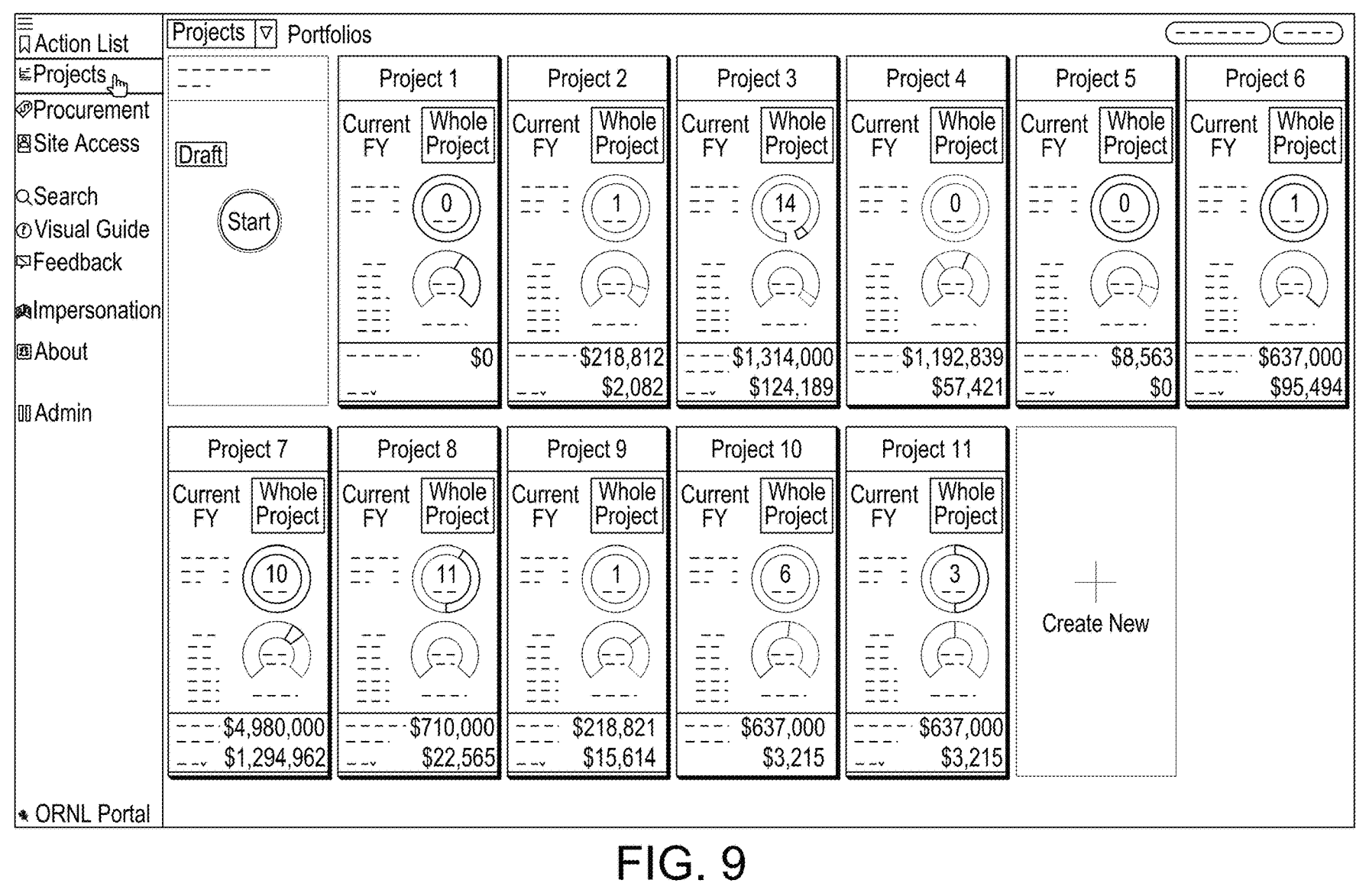

Each one of the virtual cards shown in FIG. 9 represents a project that automatically pulls information from other monitoring applications. The third virtual card in the first row is tracking Project 3 that has a total budget of about 1.3 million dollars and a balance of about 124 thousand dollars. The virtual cards allow you to view the project for the entire project period or the current fiscal year via links within the virtual cards by pulling information from ancillary applications and rendering it through widgets. For example, milestones for each of the projects are summarized by a widget that show milestones that are overdue and those occurring in the future. And, cost widgets, for example, shows that the project planned to spend, what they actually performed today, and what it actually cost them today.

Figure 10:
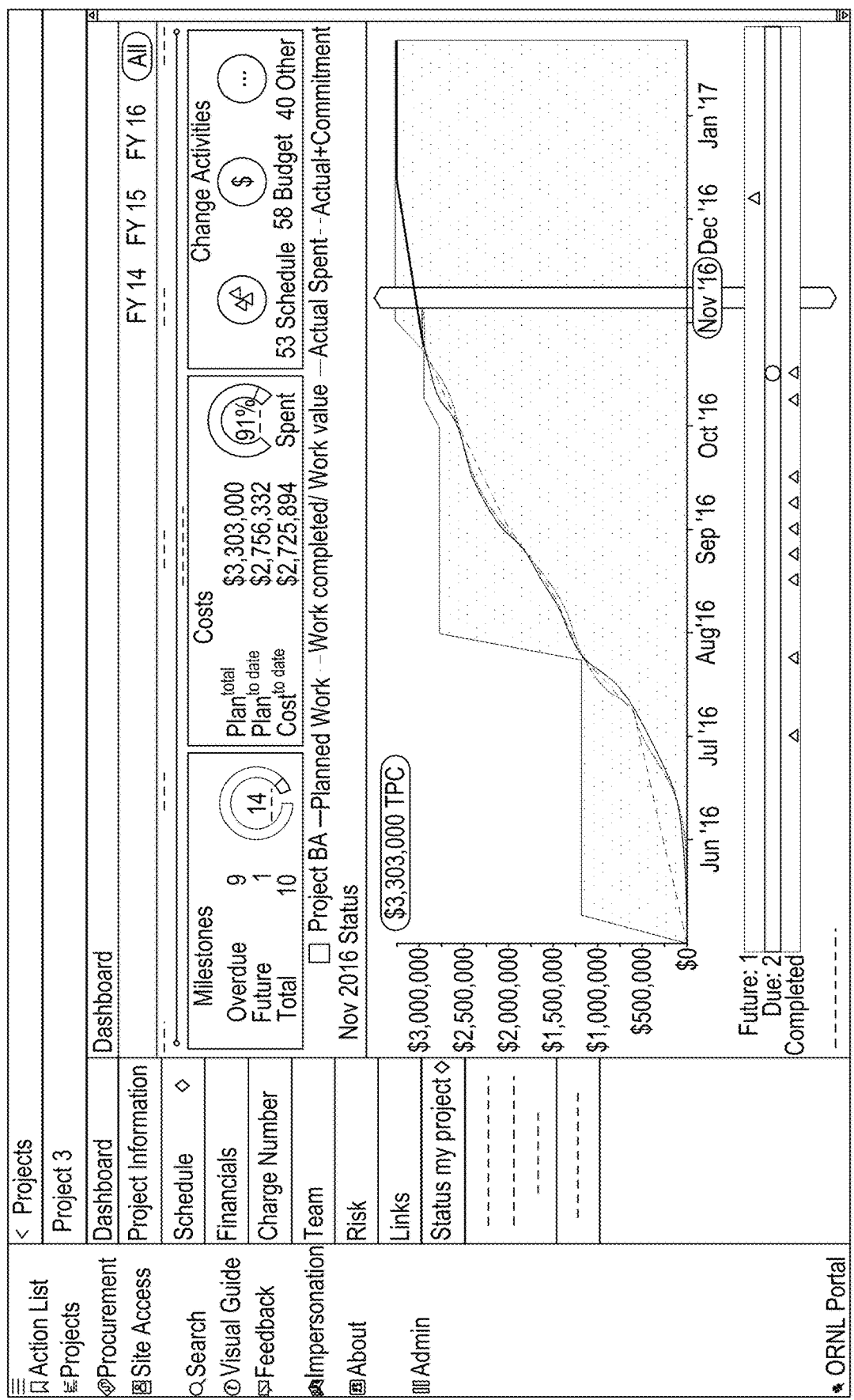
FIG. 10 shows a native application display associated with project management rendered by the RES system.

When a user actuates the tab positioned on the widgets, the user it transported to the interactive project detail area as shown in FIG. 10. The user lands on the project dashboard that provides at a-glance key performance indicators relevant to the particular object of the business process such as it milestones, costs, and change activities, for example. Key performance indicators may also include the length of the project that RES pulls from the project schedules and that allows a user to enlarge different parts of the schedule to analyze specific parts of their cost schedules and milestones or analyze whatever time frame a user wishes to focus that is rendered on a standard project management chart called a SPA chart. SPA is an acronym for the budget amount scheduled or spend plan.

Figure 11:
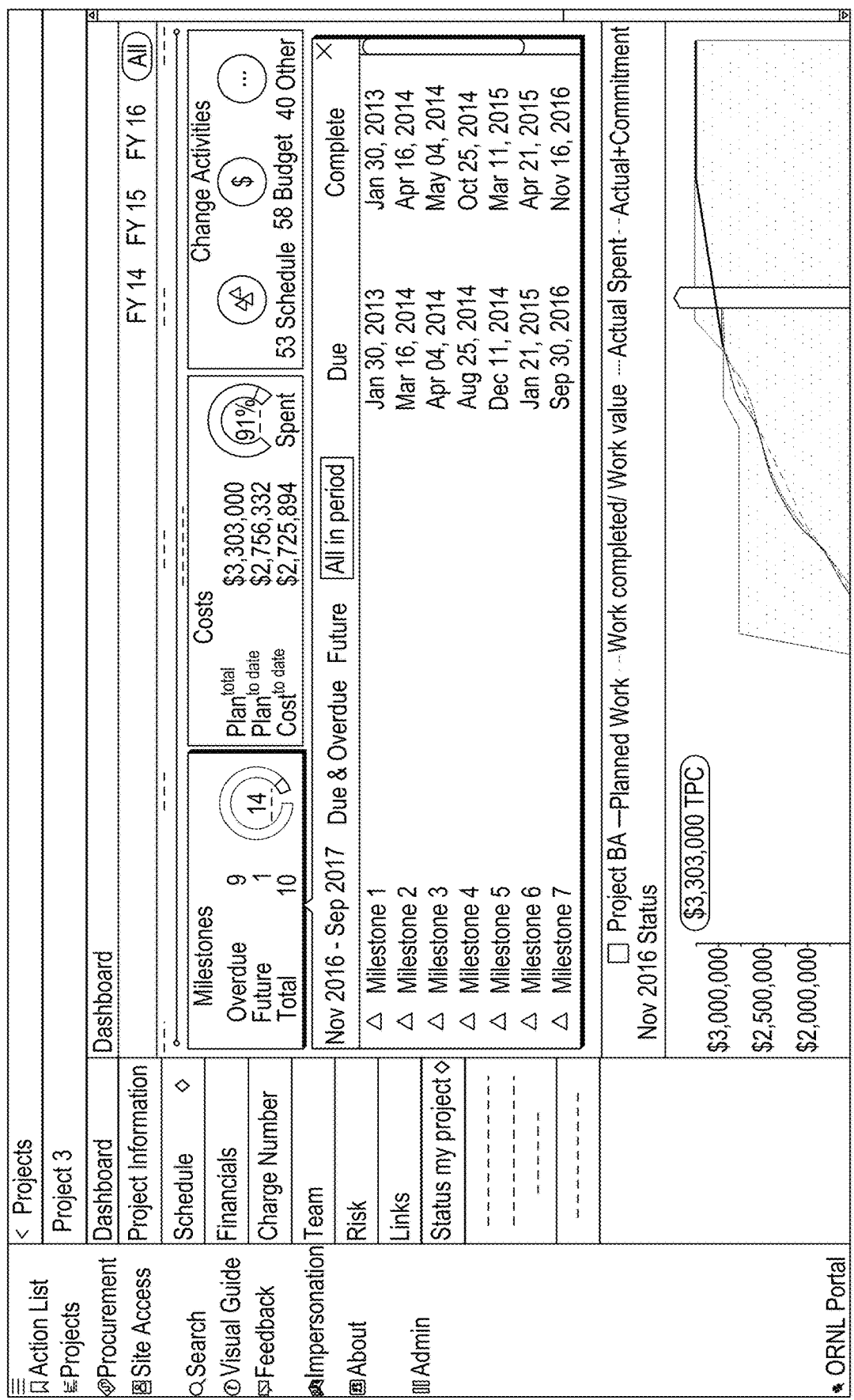
FIG. 11 is a granular view of milestones tracked by the native application display associated with project management rendered by the RES system.

The milestones, costs, and change activities of FIG. 10 are rendered through widgets that are portable between displays and render a light touch. In FIG. 10, the widgets may also render more granular data, that is accessible right from the user's screen. For example, clicking on the green portion of the milestone gauge renders all of the milestones on the project. By clicking on the red portion of the milestone gauge a user renders the milestones that are overdue, such as a test that was due Aug. 31, 2016 that is overdue as shown in FIG. 11 and further through the circled red triangular symbol below the SPA chart in FIG. 12. As shown in the details below the SPA chart in FIG. 12, one milestone was completed early, another milestone was completed on time, and a third milestone was missed.

Figure 12:
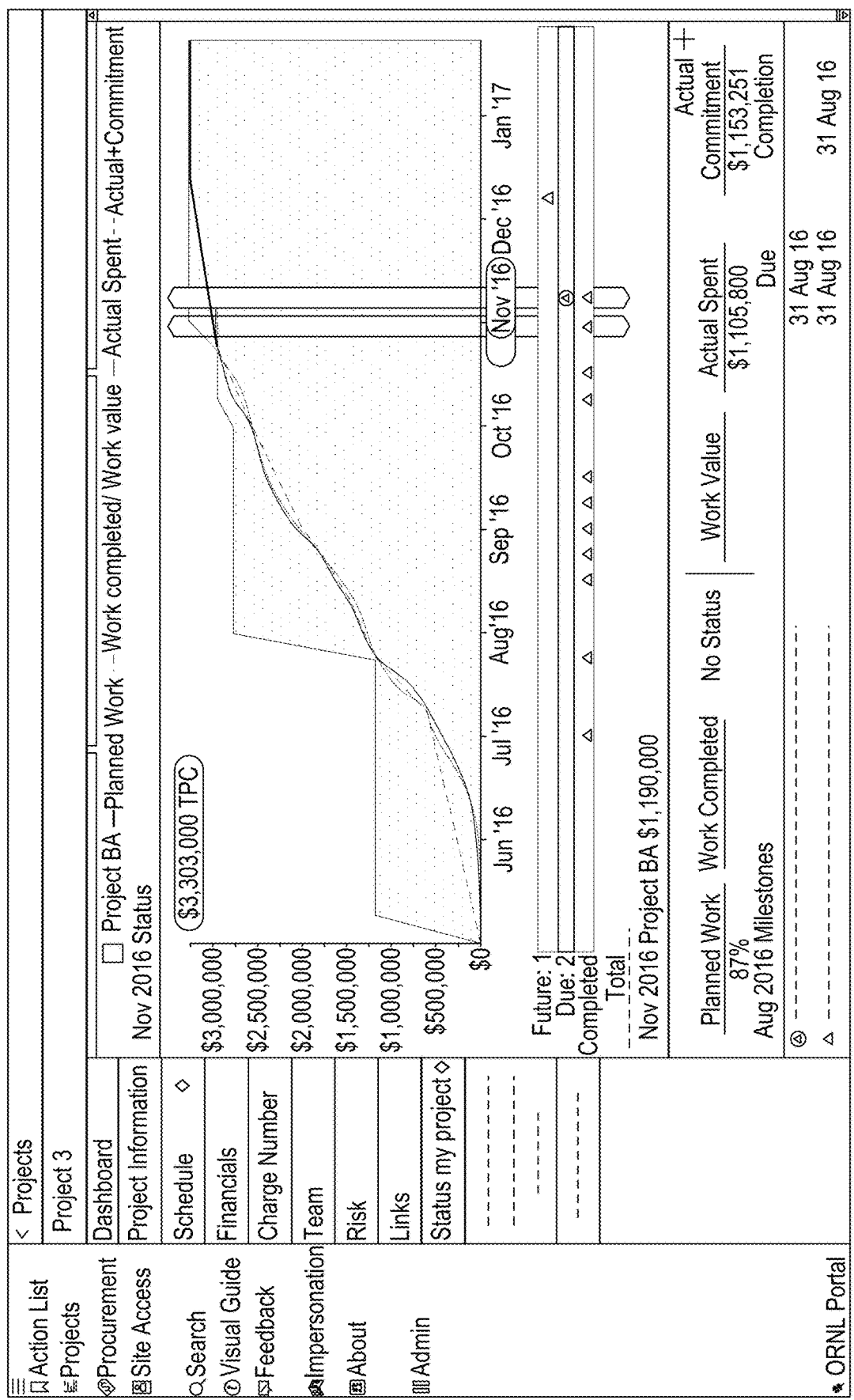
FIG. 12 is a second granular view of the milestones tracked by the native application display associated with project management rendered by the RES system.
Figure 13:
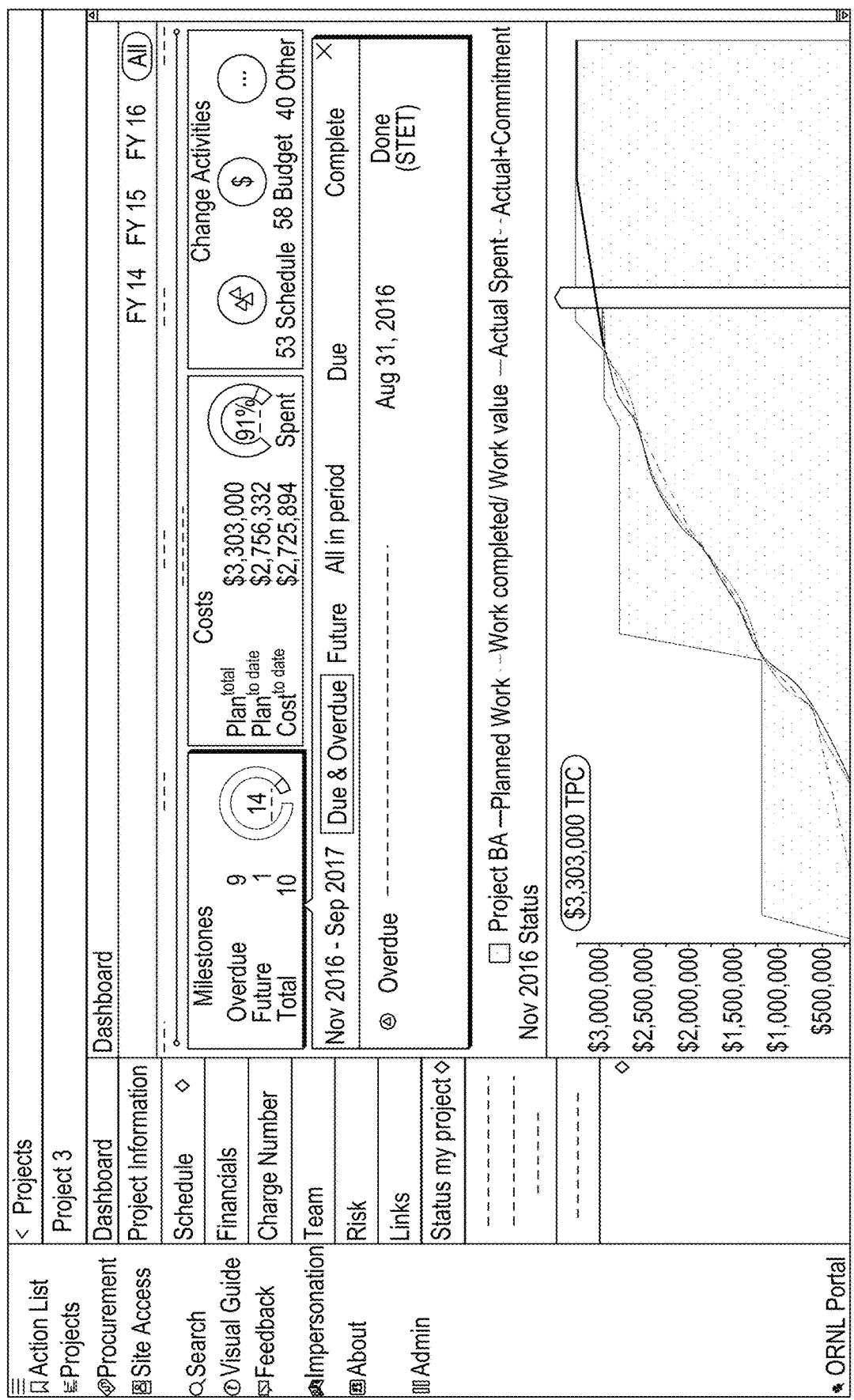
FIG. 13-15 illustrate cumulative budget tracking executed by the native application display associated with project management rendered by the RES system.
Figure 14:
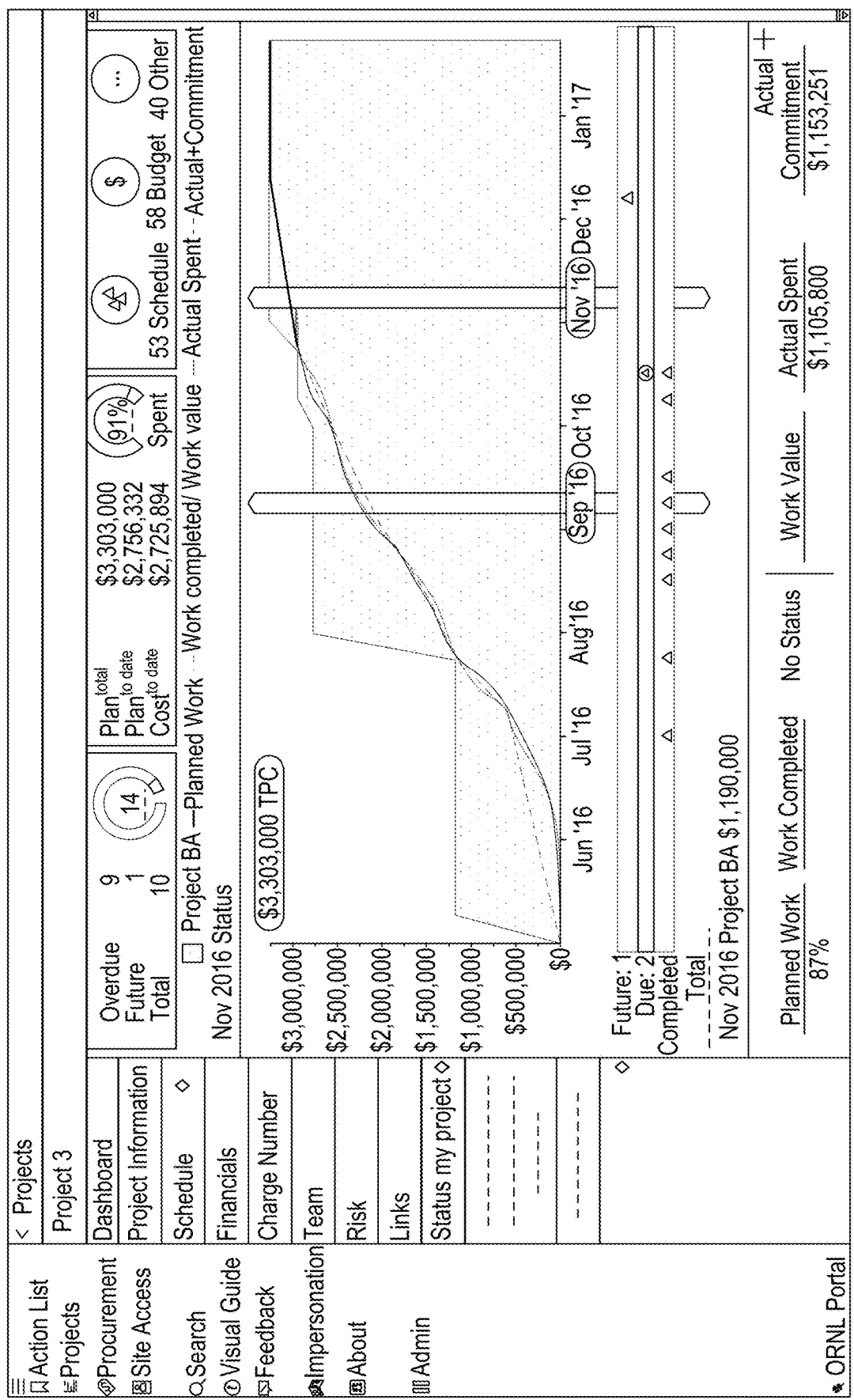
Figure 15:
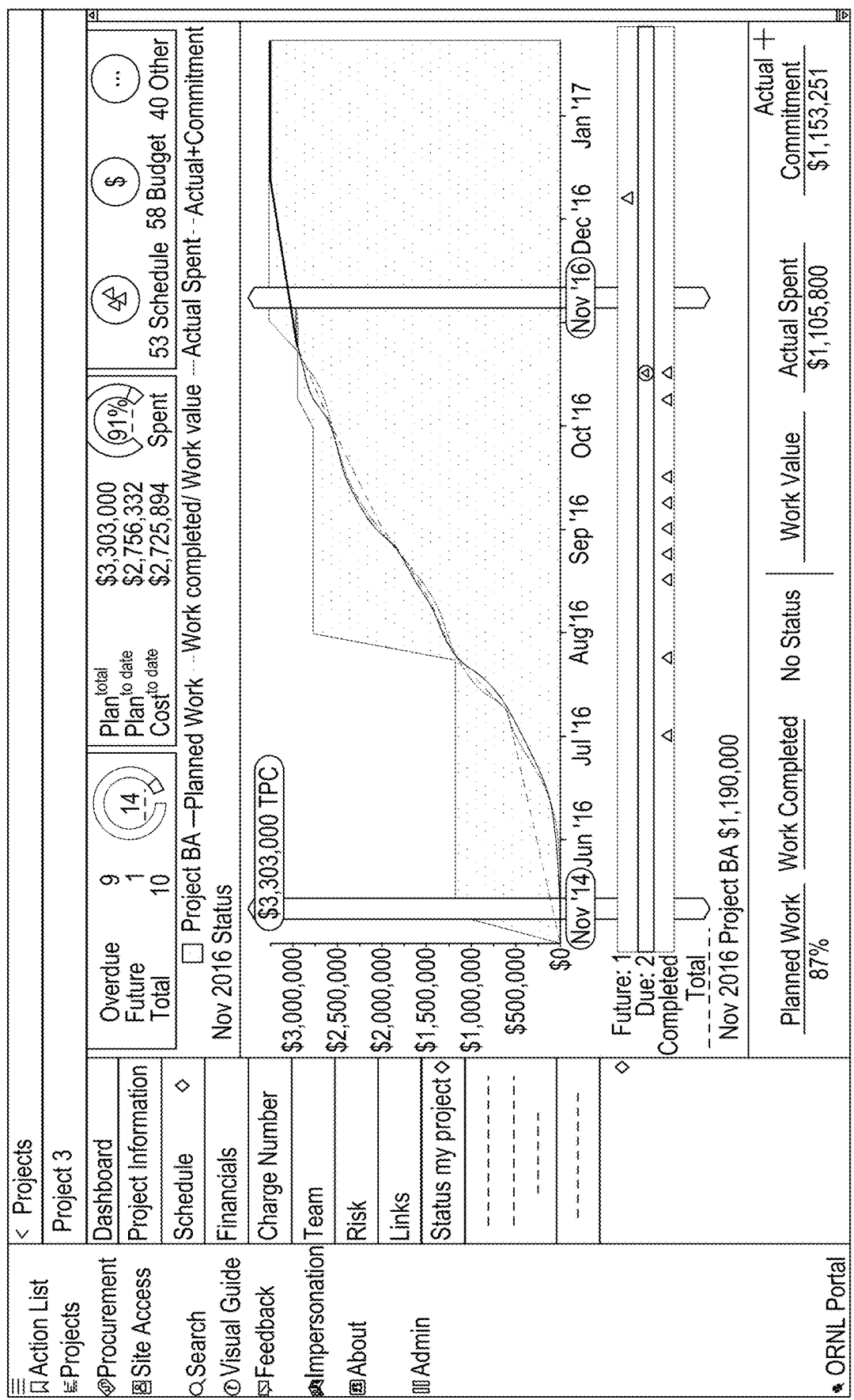

In FIGS. 12-14, the purple line that underlies the orange line represents how a project manager projects spending. The orange line is the performance line that is the line that indicates where the project manager believes the project is performing. In other words, is he/she is accomplishing the work that he/she planned to do. That is, he is performing the work. The green shading between the green lines represent cost. The bottom green line represents the actual cost—that is what the project actually spent; while, the top part of the green line is the projects actual costs plus the projects outstanding commitments which may originate from a contract that establishes the actual money committed. By the full charts shown in FIGS. 12, 14, and 15, a user can see what a project planned to spend, what was actually done, whether the project is spending at its proper rate, what are the actual costs, and whether the project is on schedule. The gray silhouette behind the lines of the SPA chart represent the projects actual spending. So, in this example, the project began in October 2015 and it was funded immediately as shown in FIG. 15, but the project spent very little money. To meet obligated milestones, spending accelerates toward the end of 2015.

Figure 16:
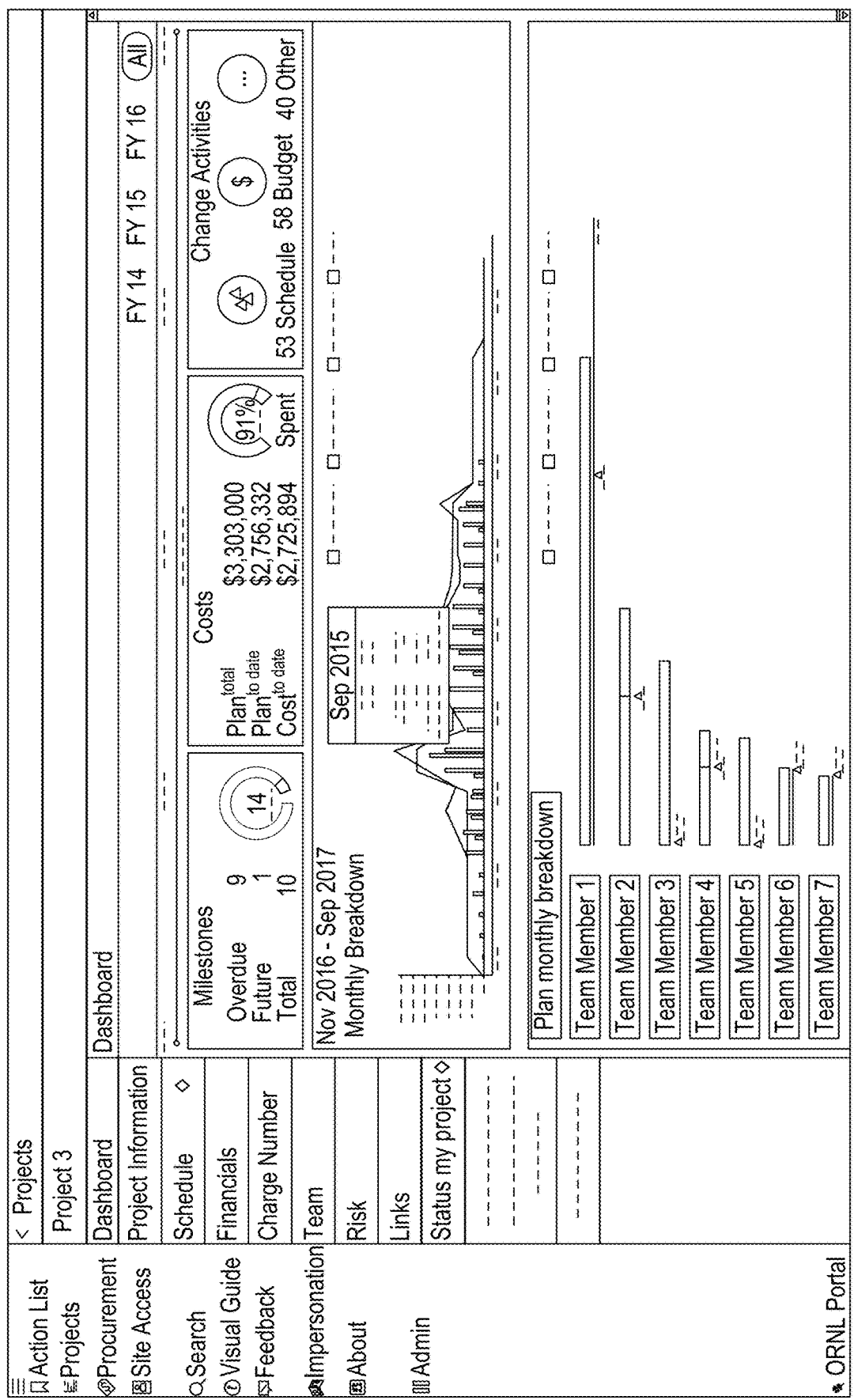
FIG. 16 illustrate a monthly budget tracking executed by the native application display associated with project management rendered by the RES system.

When the cost widget of FIG. 15 is selected, the RES system generates a spending report by month as shown in FIG. 16. In FIG. 15 cost was shown cumulatively. In FIG. 16 cost is shown monthly. The continuous gray line shown in FIG. 16 that outlines the peaks and valleys illustrates the planned spending per month and the shaded gray silhouette shows the actual spending on materials, sub-contracts, labor, and internal sources. So, in the spending report shown of FIG. 16 the project is trending below the planned spending line. It further shows who has been charging the project, at what rate they are charging, and their planned or forecasted budget. For example, FIG. 16 shows Team Member 1 was budgeted to spend 1694 hours at a point in time against the project but spent 2,276 hours of her total budget of 2,900 hours. By this illustration a user can see that Team Member 1 is spending over her forecast, but she is not over budget. Whereas, Team Member 2 has a total budget of 690 hours but has spent 1,010 hours and is thus over budget. And, Team Member 3 who was originally not part of the project has spent 828 hours.

Figure 17:
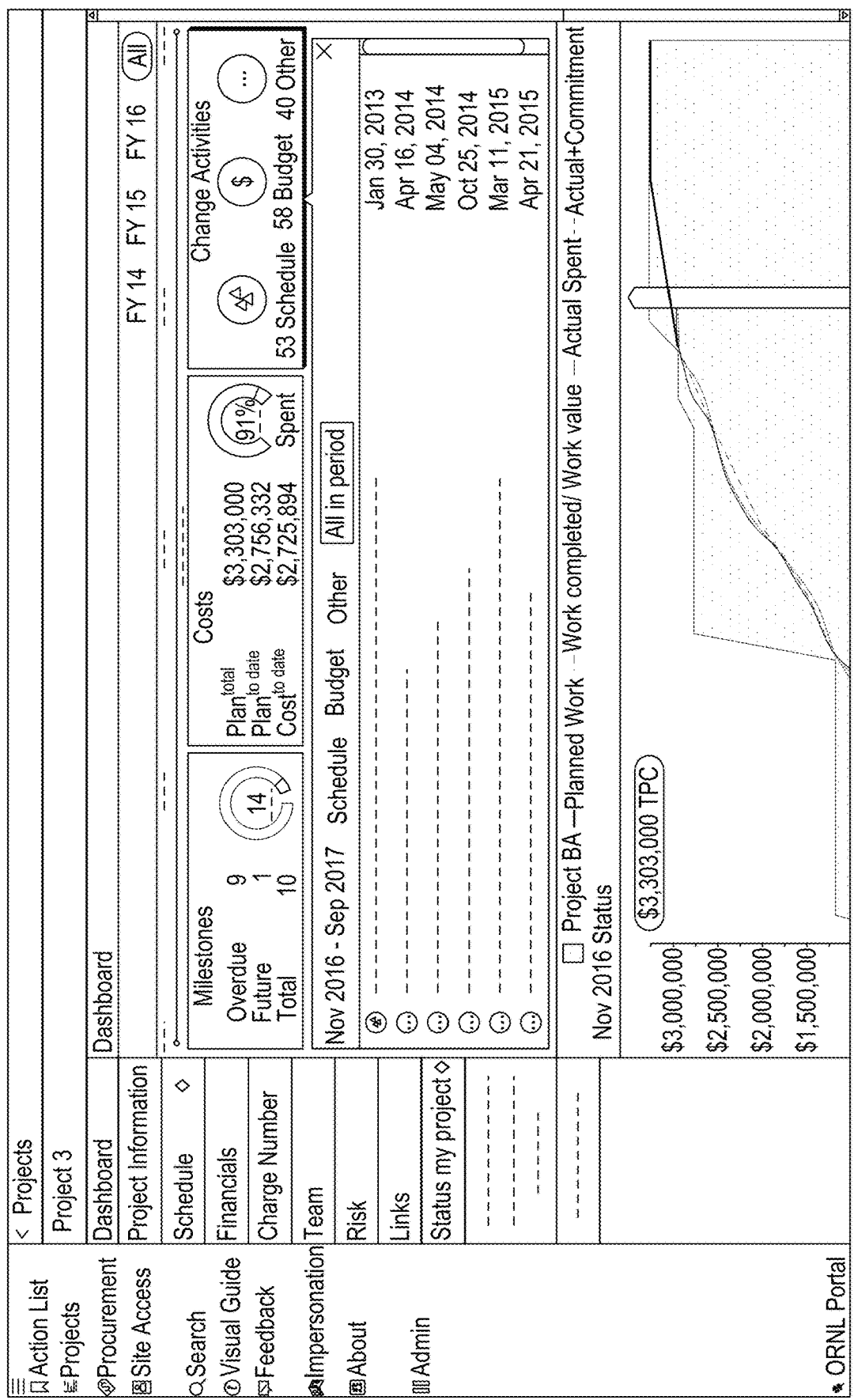
FIG. 17 illustrate a change activity tracking executed by the native application display associated with project management rendered by the RES system.

The project functionality of the RES also includes a change activity widget that captures the changes to the project as it occurs as shown in FIG. 17. A project may change any parameter during its lifecycle such as a schedule change, a budget change, or some other change and this widget captures the changes as they occur in a project.

Figure 18:
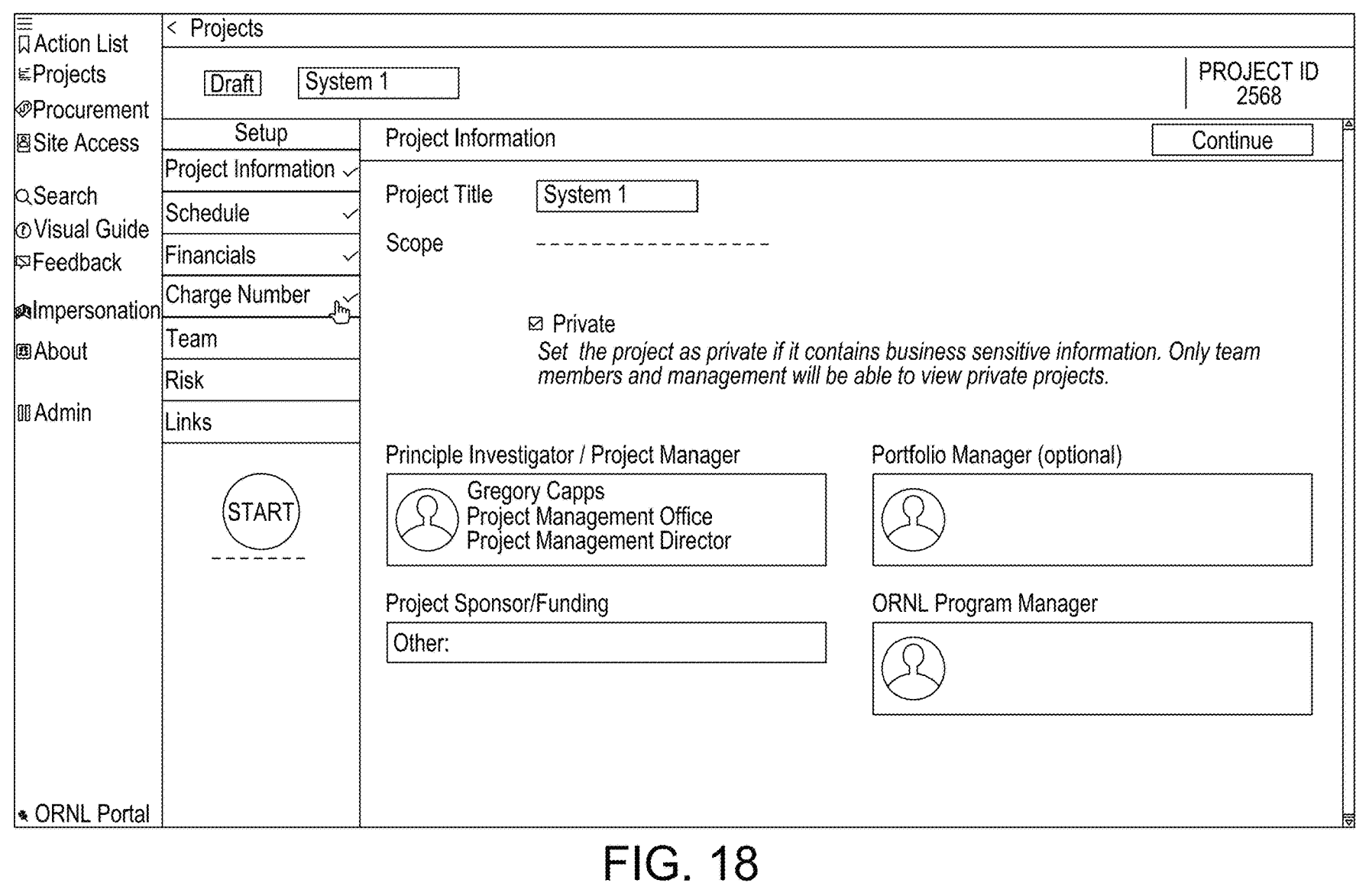

To start a project, four pieces of information is needed: general information, a schedule, and a charge number as shown in FIG. 18, which may be pulled from systems interfaced to the middleware application 104. In this project functionality of the RES, the data fields may be self-populated or pulled from an in system library from integrated project systems automatically. If not self-populated, a user can provide the required general information that may include the project title, the project's scope, the name of the principal investigator, the name of the portfolio manager, the name of the funding manager, and the name of the entity or individual that is funding the project. The schedule information may be entered next through the schedule tab, which may include a start date, an end date, and the milestones to be tracked. In the financial tab, the user may enter the total budget cost and the years to spend that money. The project functionality may automatically spread the budget just as a user may enter special expenditures or customize the budget schedule or spending plan. Should a budget change, such as additional money is allocated to it, project managers need not immediately recognize the change, because once a change is entered, the gray silhouette behind the lines of the SPA chart that represent the projects actual spending, for example, will automatically change showing how the baseline has changed. The next piece of information to be entered into the system is the charge number—this is how the middleware connect information to an accounting system. With that final information entered all the financial information associated with that number is pulled into the system through the middleware application 104. Once completed, the RES system renders the project.

Figure 21:
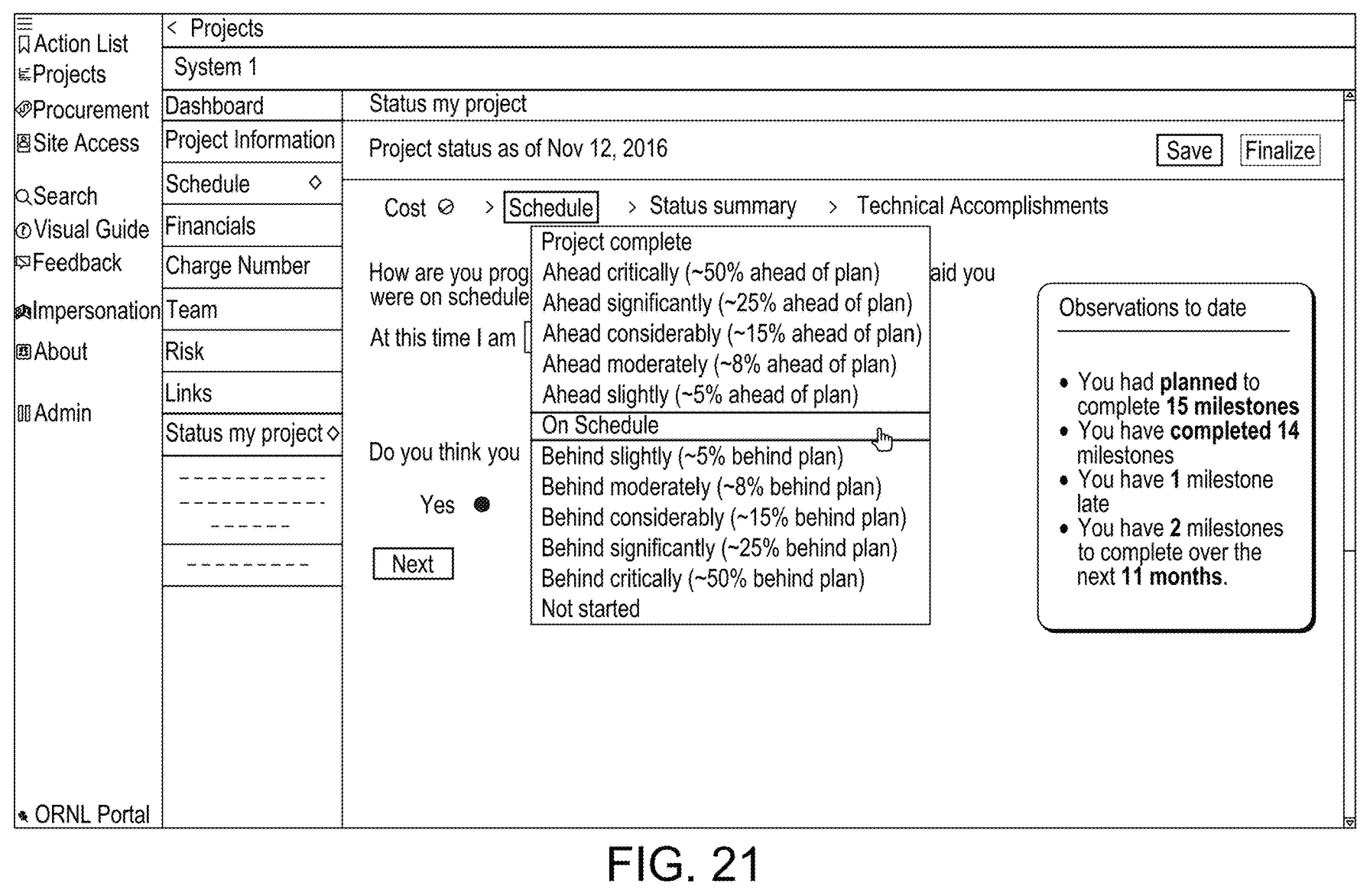
Figure 22:
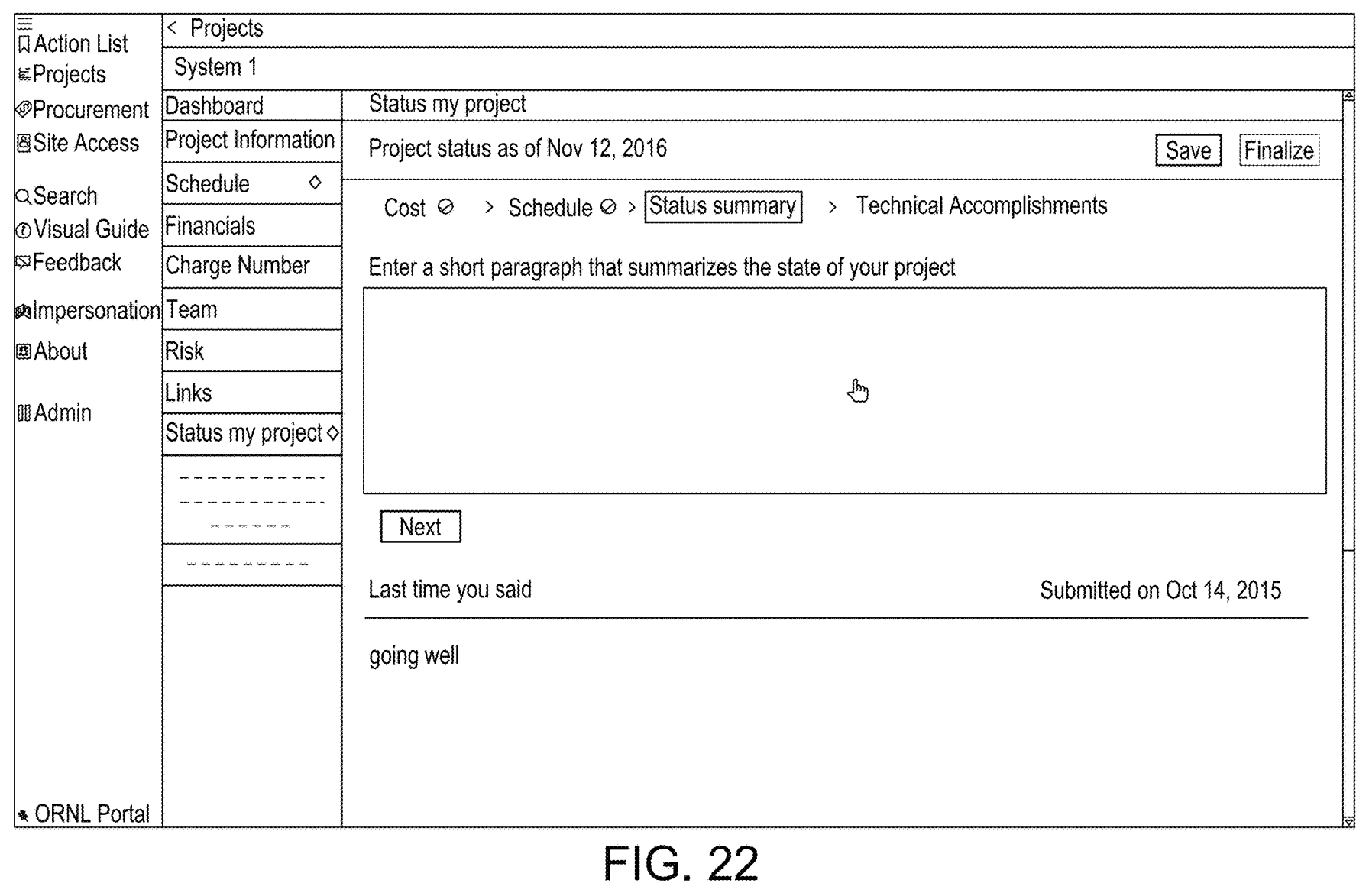
Figure 23:

There are four additional tabs of information to be entered that may be manually or automatically selected. There is a team area in which team members may be selected via an employee directory. A user may forecast how many hours a member may charge the project per year and their permissions, such as permissions to establish, modify, or eliminate milestones. There is also a risk register that can be set up for project risks. This may reflect anticipated delays and bottlenecks. The risk register allows those risks to be captured and monitored. And, there are links to other sites that may be entered through the links tab that may be pointers to external or internal resources as shown in FIGS. 18 and 19. Finally, the status my project poses a series of questions that may help manage the project relating to cost, schedule, status summary, and technical accomplishments as shown in FIG. 20. Cost seeks information on how the project is managing costs in the current year and overall. As shown, observations are provided near those inquires to provide a better reasoned response. Schedule seek information on how the project is progressing on their schedule in the current year and overall as shown in FIG. 21. The status summary captures a user's narrative indicating how the project is progressing via a text box as shown in FIG. 22. And, a technical accomplishment text entry box captures any accomplishments that a user notes as shown in FIG. 23.

Figure 24:
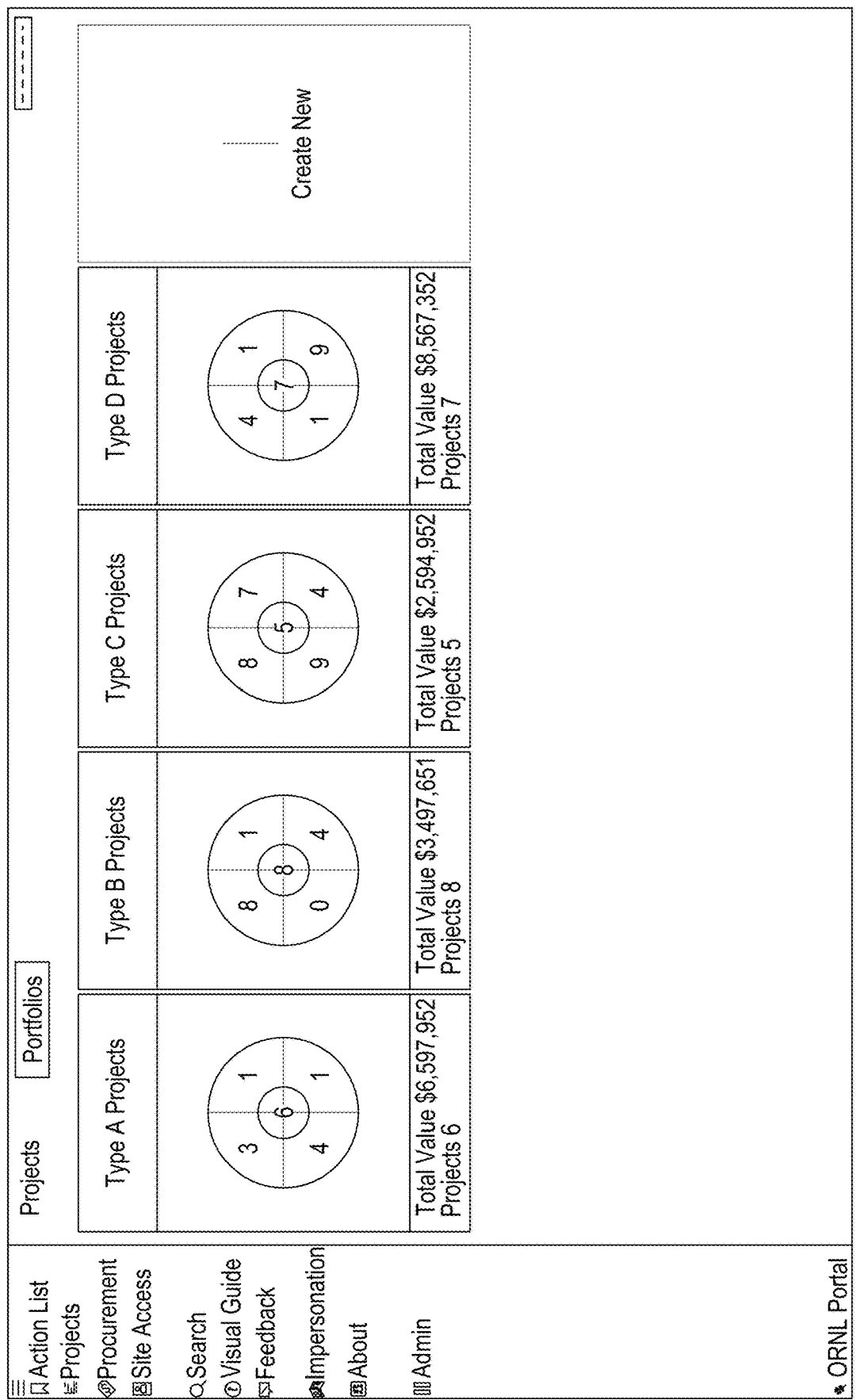
Figure 25:
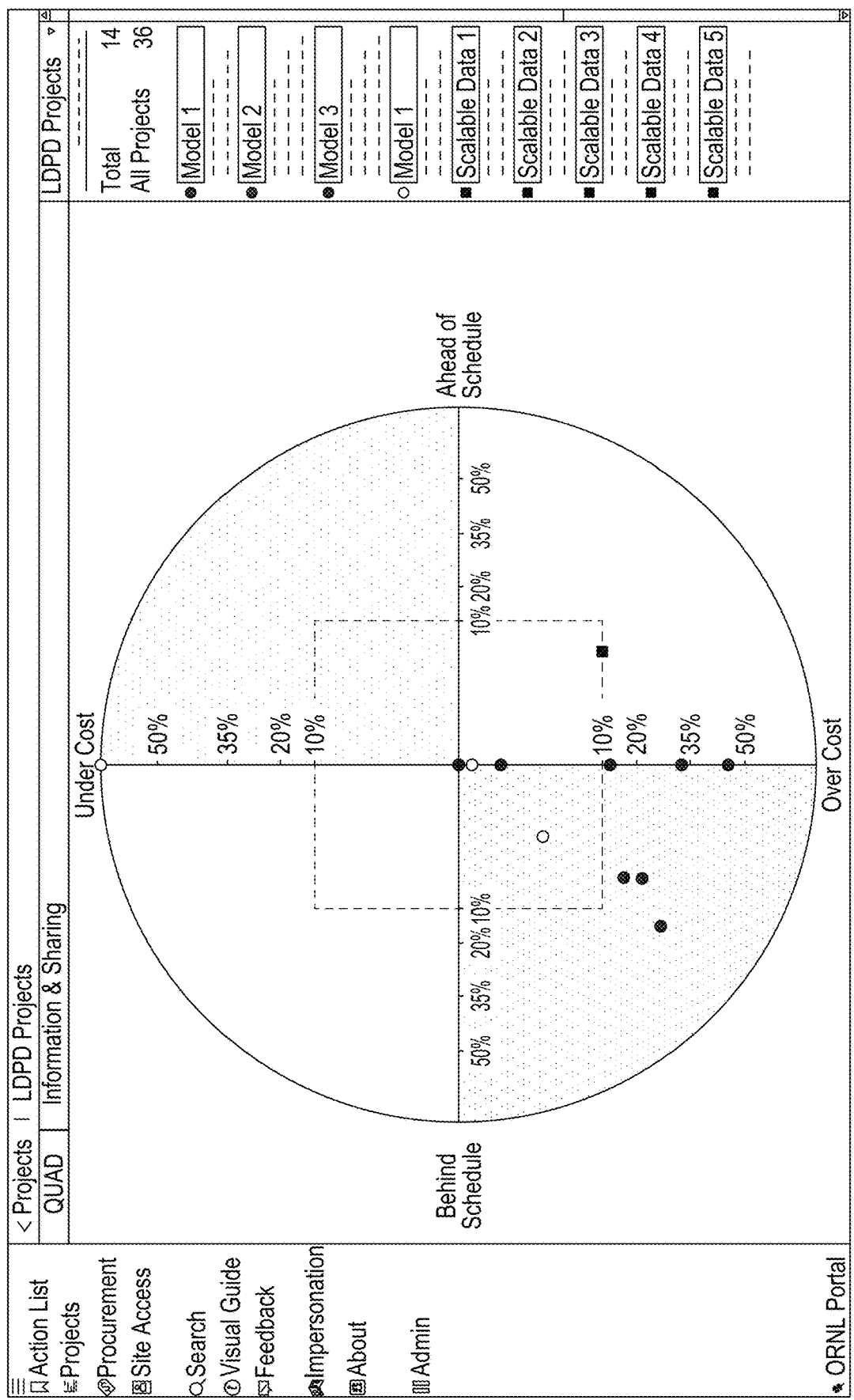
FIGS. 25 and 26 are quad charts of a schedule versus cost generated by the RES system.
Figure 26:
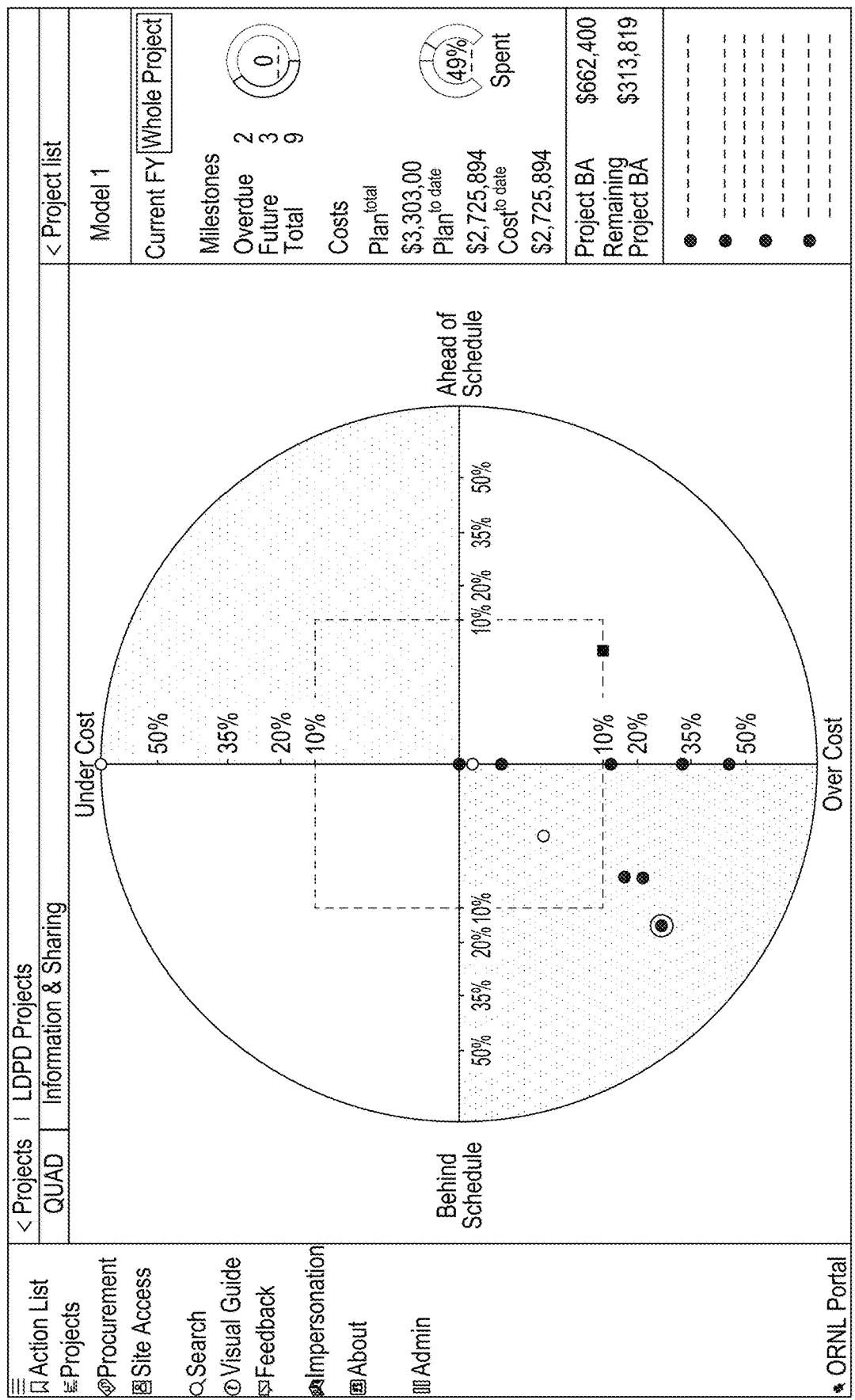
Figure 27:
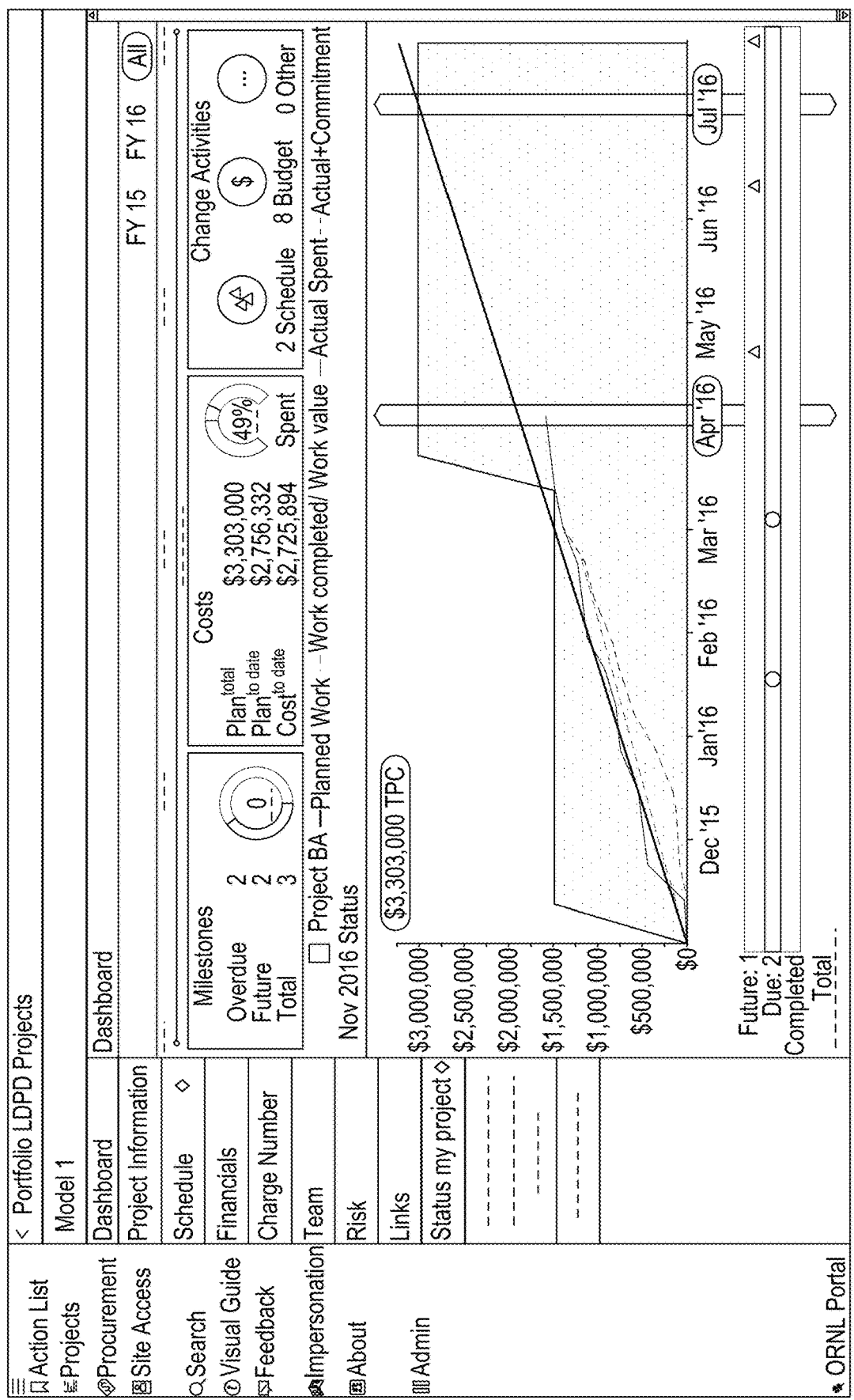
FIG. 27 is another a native application display associated with project management rendered by the RES system.

RES also renders displays that track portfolio of projects such as the projects shown in FIG. 24. Rather than compositing images the portfolio functionality renders metrics that track the portfolio and render a portfolio of a number of projects, such as the twelve shown in FIG. 25. The quad graph of schedule versus cost is positioned adjacent to the project cards that the system is monitoring in FIG. 25. So, when projects are over cost and behind schedule, a project can be selected by clicking on the graphical point on the quad graph rendering its project card as shown in the right hand portion of FIG. 26. Clicking on the project card takes the user directly into the project allowing the user to monitor the details of that project as shown in FIG. 27 which allows the user to perform the necessary triage to get the project back on track or schedule.

Figure 28:
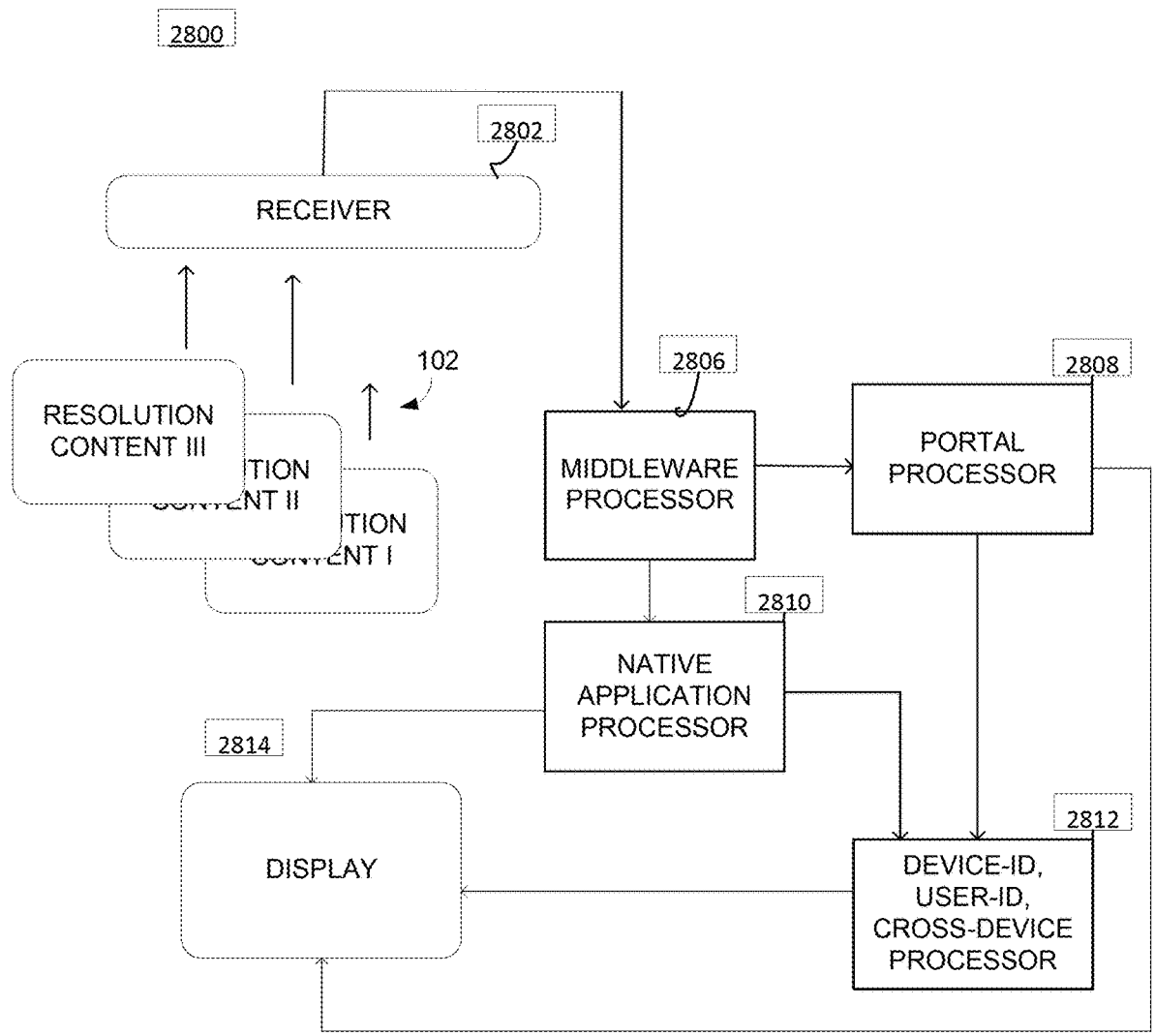
FIG. 28 is a schematic representation of the RES system.

FIG. 28 is a schematic representation of the RES system. The RES system 2800 is an example system for use in a cloud based or local storage based system. The example system configuration includes one or more receivers 2802, a middleware processor 2806, a portal processor 2808, an optional device-id, user-id, and cross-device processor 2812 and a display 2814. The receiver 2802 may receive incoming content from multiple system and processes that is stored locally or in a cloud. The middleware processor 2806 transparently maps links and relations from the data and information received by the receiver. The portal processor 2808 associates data from diverse sources and integrates the information that is transmitted to the display 2814 or the optional device-id, user-id, and cross-device processor 2812. The actions, alerts, radar, procurement, and personal access user interfaces may be rendered by the portal processor 2808. The native application processor 2810 executes and serves native applications such as the project functionality that is transmitted to the display 2814 or the optional device-id, user-id, and cross-device processor 2812. The optional device-id, user-id, and cross-device processor 2812 identifies the users and their devices and tailors the content delivered to the display 2814 to the form factor and function of the wireless or wired devices that render a user's visual output. The display 2814 is a visual output device for rendering output.

Figure 29:
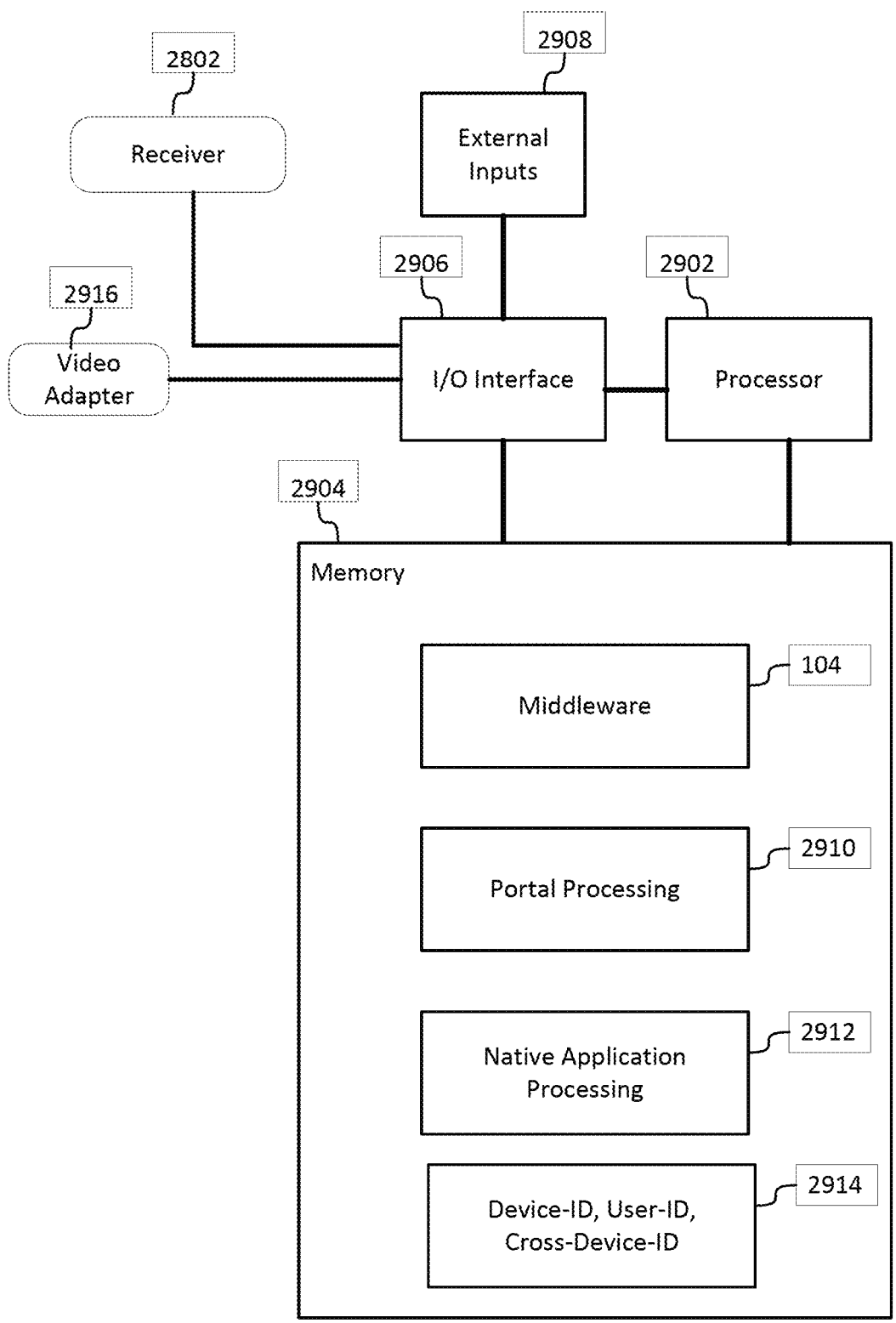
FIG. 29 is a block diagram of an alternate RES system.

FIG. 29 is a block diagram of an alternate RES system that streamlines resource management. The system comprises a processor 2902, a non-transitory media such as a memory 2904 (the contents of which are accessible by the processor 2902) and an I/O interface 2906. The I/O interface 2006 may be used to connect devices such as, for example, additional wireless devices, the video adapter 2916, and the receiver 2802 to the processor 2902. The memory 2904 may store instructions which when executed by the processor 2902 causes the RES system to render some or all of the functionality associated with the RES system as described herein. For example, the memory 2904 may store instructions which when executed by the processor 2902 causes the RES system to render the functionality associated with the middleware 104, the portal processing 2910, the native application processing 2912 and the optional device, user, and cross-device identifications 2914.

The processor 2902 may comprise a single processor or multiple processors that may be disposed on a single chip, on multiple devices or distributed over more than one system. The processor 2902 may be hardware that executes computer executable instructions or computer code embodied in the memory 2904 or in other memory to perform one or more features of the RES system. The processor 2902 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 2904 or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 2904 may comprise a single device or multiple devices that may be disposed on one or more dedicated memory devices or on a processor or other similar device.

The memory 2904 may also store computer code, such as the middleware processor 2806, the portal processor 2808, the native application processor 2810, and the optional device-ID, User-ID, and cross-device-ID as described herein. The computer code may include instructions executable with the processor 2902. The computer code may be written in any computer language, such as C, C++, assembly language, channel program code, and/or any combination of computer languages. The memory 2904 may store information in data structures.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The RES system streamline processes across procurement, research, product assembly, manufacturing, service, sales, finance, and/or human resources using local caches and/or local proxies. These systems generate graphically rich interactive project screens that dynamically render project information over time while rendering cost commitments through transparent mappings of resource addresses of remote sources and destinations to local sources such as local caches and/or local proxies, for example. The transparency mapping and redirection to local sources render an impression that content is being served from external remote sources and destinations without the latencies, delay, or bandwidth use that accompanies convention remote requests/responses in use today. The systems dynamically highlight key attributes of projects through scalable time periods through a program that may be turned on or off through a common action. The systems provide alerts and action indicators through dynamic project cards while providing observations that users select or enter. In operation, some users are granted access to any projects in their program or line of command through desktop or mobile interfaces (e.g., through an Apple iOS or Android operating system or device) by the system's knowledge through a deterministic or probabilistic tracking. When access is granted, users can enter observations and establish analytics that track program performance. The system is fully automated such that the information rendered is continuously updated.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A method that provides access to remote data locally comprising:
identifying a linked content from a plurality of remote sources through a communication network;
downloading the linked content from the plurality of remote sources through the communication network;
decomposing the downloaded content into local content elements by intercepting links between content elements and mapping the intercepted links to redirected links that locate the linked content download in a local cache or a local server proxy;
identifying remote devices requesting access to the local cache or the local server proxy and the remote devices functionality through a tracking code stored on the remote devices and a probabilistic tracking identifier that identifies the remote devices; and
providing access to the local cache or the local server proxy in response to authorizations associated with the identified remote devices and a user.

2. A non-transitory computer readable medium storing a program that provides access to remote data locally by:
identifying a linked content from a plurality of remote sources through a communication network;
downloading the linked content from the plurality of remote sources through the communication network;

decomposing the downloaded content into local content elements by intercepting links between the content elements and mapping the intercepted links to redirected links that locate the linked content download in a local cache or a local server proxy;

identifying remote devices requesting access to the local cache or local server proxy and the remote devices functionality through a tracking code stored on the remote devices and a probabilistic tracking identifier; and providing access to the local cache or the local server proxy in response to authorizations associated with the identified remote devices and a user.

3. A system that that provides access to remote data locally by comprising:

a receiver for receiving linked content from a plurality of remote sources through a communication network;

a hardware processor programmed to decompose a downloaded content into local content elements by intercepting resource links between content elements and mapping the intercepted resource links to redirected links that locate the download content in a local cache or a local server proxy;

the hardware processor is further programmed to identify remote devices requesting access to the local cache or the local server proxy and the remote devices functionality through a tracking code stored on the remote devices and a probabilistic tracking identifier that identifies the remote devices; and the hardware processor is further programmed to access the local cache or the local server proxy in response to authorizations associated with the identified remote devices and a user.

4. The method of claim 1 where the probabilistic tracking identifier identifies the user.

5. The method of claim 1 where the probabilistic tracking identifier is based on a device data and a contextual information.

6. The method of claim 1 further comprising deliver a content to a form factor of a user's device.

7. The method of claim 1 where the user is identified by a deterministic tracking data.

8. The method of claim 7 where the deterministic tracking data comprises login credentials.

9. The method of claim 7 where the deterministic tracking data identifies wireless devices.

10. The system of claim 3 where the probabilistic tracking identifier identifies the user.

11. The system of claim 10 where the probabilistic tracking identifier is based on a device data and a contextual information.

12. The system of claim 3 where the hardware processor is further programmed to deliver a content to a form factor of a user's device.

13. The system of claim 3 where the user is identified by a deterministic tracking data.

14. The system of claim 13 where the deterministic tracking data comprises login credentials.

15. The system of claim 13 where the deterministic tracking data identifies wireless devices.

16. The system of claim 3 where content in the local cache or the local server proxy comprises data related to a management and a funding.

17. The system of claim 3 where the hardware processor is further configured to communicate with an application software.

18. The system of claim 3 where the hardware processor is configured to render virtual cards on a display that actuate programs that automatically harvest information from a plurality of monitoring applications.

19. The system of claim 18 where the hardware processor is configured to render widgets on the display.

20. The system of claim 3 further comprising an interactive display that tracks projects.

* * * * *